United States Patent
Suzuki et al.

(10) Patent No.: US 11,891,052 B2
(45) Date of Patent: Feb. 6, 2024

(54) PARKING CONTROL METHOD AND PARKING CONTROL DEVICE

(71) Applicant: Nissan Motor Co., Ltd., Yokohama (JP)

(72) Inventors: Yasuhiro Suzuki, Kanagawa (JP); Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/157,950

(22) Filed: Jan. 23, 2023

(65) Prior Publication Data

US 2023/0150483 A1 May 18, 2023

Related U.S. Application Data

(63) Continuation of application No. 16/652,299, filed as application No. PCT/JP2017/036322 on Oct. 5, 2017, now abandoned.

(51) Int. Cl.
*B60W 30/06* (2006.01)

(52) U.S. Cl.
CPC ......... *B60W 30/06* (2013.01); *B60W 2554/80* (2020.02)

(58) Field of Classification Search
CPC .................. B60W 30/06; B60W 2554/80
See application file for complete search history.

(56) References Cited

U.S. PATENT DOCUMENTS

| | | | |
|---|---|---|---|
| 6,170,591 B1 | 1/2001 | Sakai et al. | |
| 2009/0309970 A1 | 12/2009 | Ishii et al. | |
| 2013/0085637 A1 | 4/2013 | Grimm et al. | |
| 2016/0378104 A1* | 12/2016 | Hiei | G05D 1/005 |
| | | | 701/2 |
| 2018/0308359 A1 | 10/2018 | Hayakawa | |

FOREIGN PATENT DOCUMENTS

| | | | |
|---|---|---|---|
| DE | 102010056064 A1 * | 6/2012 | ............ B60W 30/06 |
| DE | 102010056064 A1 | 6/2012 | |
| DE | 112014003229 T5 | 5/2016 | |
| DE | 102015003964 A1 | 9/2016 | |
| EP | 3053809 A1 | 8/2016 | |
| EP | 3135565 A2 | 3/2017 | |
| JP | H10-167103 A | 6/1998 | |
| JP | 2008-074296 A | 4/2008 | |
| JP | 2011-230549 A | 11/2011 | |

(Continued)

*Primary Examiner* — Vivek D Koppikar
*Assistant Examiner* — Jeffrey R Chalhoub
(74) *Attorney, Agent, or Firm* — Young Basile Hanlon & MacFarlane, P.C.

(57) ABSTRACT

A parking control method causes a control device of a vehicle to execute a first control instruction for moving the vehicle along a first route to a target parking space, on the basis of an operation command acquired from an operator located outside the vehicle. This method includes, when execution of the first control instruction is suspended or canceled, calculating a second route for the vehicle to leave with a predetermined distance or more from an object detected around the vehicle and causing the control device to execute a second control instruction for moving the vehicle along the second route.

9 Claims, 20 Drawing Sheets

(56) References Cited

FOREIGN PATENT DOCUMENTS

| | | | |
|---|---|---|---|
| JP | 2013-043475 | A | 3/2013 |
| JP | 2013-530867 | A | 8/2013 |
| JP | 2017-114289 | A | 6/2017 |
| KR | 20120035122 | A | 4/2012 |
| WO | 2014162753 | A1 | 10/2014 |
| WO | 2017/068695 | A1 | 4/2017 |

* cited by examiner

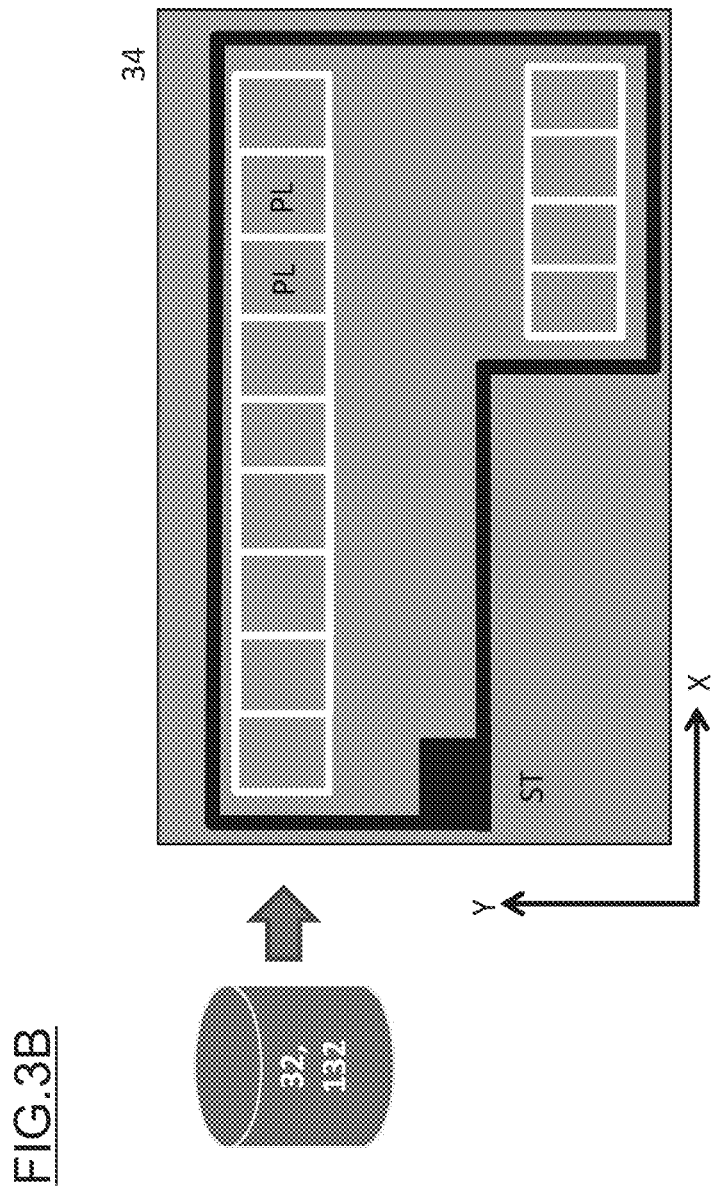

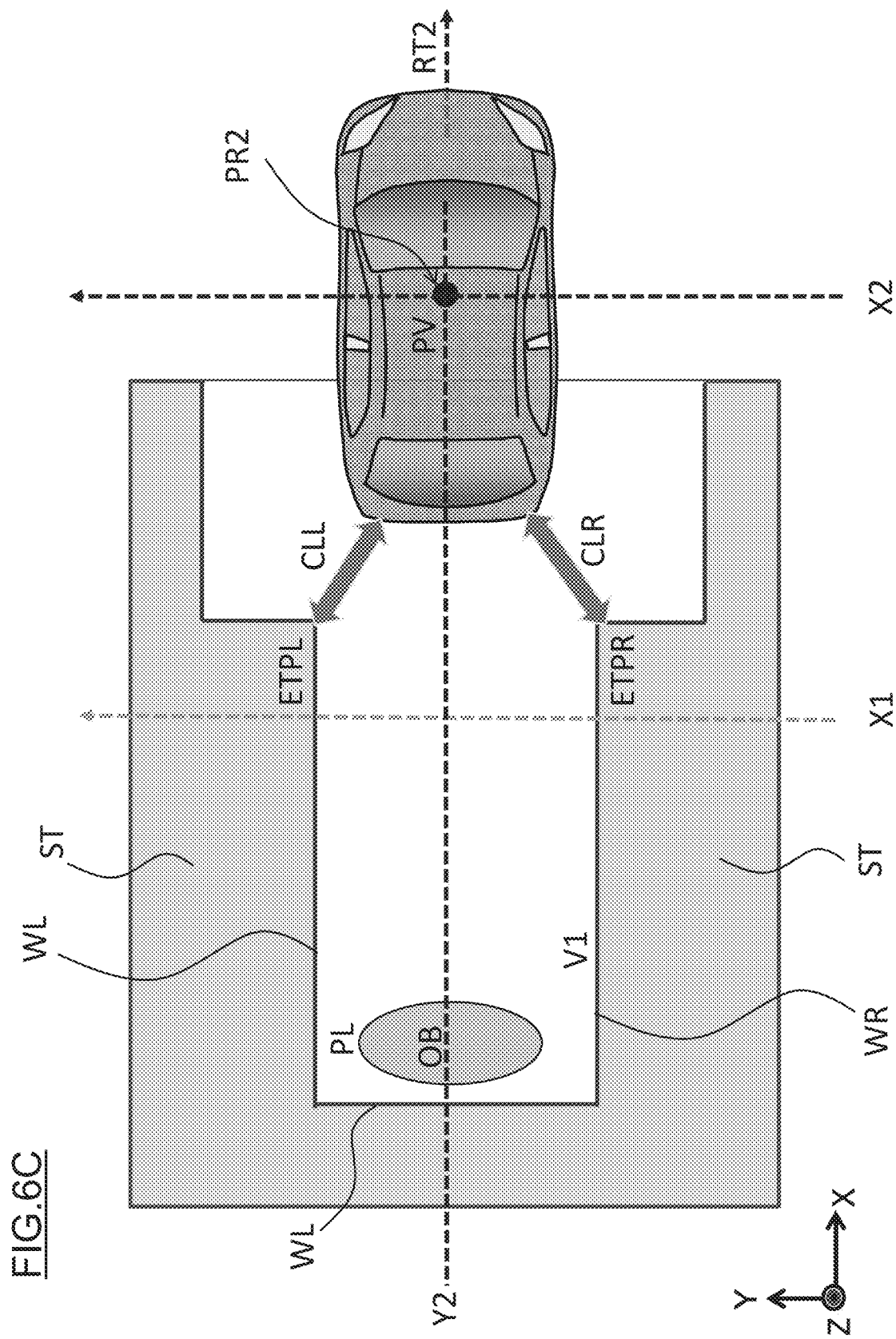

PARKING CONTROL METHOD AND PARKING CONTROL DEVICE

CROSS REFERENCE TO RELATED APPLICATION(S)

This application is a continuation of U.S. patent application Ser. No. 16/652,299, filed on Mar. 30, 2020, which is a 371 national phase application of PCT/JP2017/036322, filed on Oct. 5, 2017, the disclosures of which are hereby incorporated by reference.

TECHNICAL FIELD

The present invention relates to a parking control method and a parking control apparatus.

BACKGROUND

A technique is known in which when a vehicle is parked into a parking space by being operated from outside of the vehicle, the vehicle is controlled to make a stop if an object is detected around the vehicle (JP2008-074296A).

SUMMARY

When an object is detected in a divided parking space such as a garage and the vehicle is controlled to make a stop, the user may not be able to enter the parking space.

A problem to be solved by the present invention is to ensure a passage through which the user can enter the parking space even when an object is detected in the parking space.

The present invention solves the above problem through, when execution of a first control instruction for moving a vehicle to a target parking space is suspended or canceled, calculating a second route for the vehicle to leave with a predetermined distance or more from an object detected around the vehicle and causing a control device to execute a second control instruction for moving the vehicle along the second route.

According to the present invention, even when the vehicle is controlled to make a stop in the parking space, the user can enter the parking space.

BRIEF DESCRIPTION OF THE DRAWINGS

FIG. 3B is a diagram for describing a second detection scheme for an object;

FIG. 6C is a second diagram for describing a state in which the execution of the second control is completed;

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. The parking control apparatus may also be applied to a portable operation terminal (equipment such as a smartphone or a PDA: Personal Digital Assistant) capable of exchanging information with an onboard device 200. The parking control method according to the present invention can be used in the parking control apparatus, which will be described below.

Figure 1:
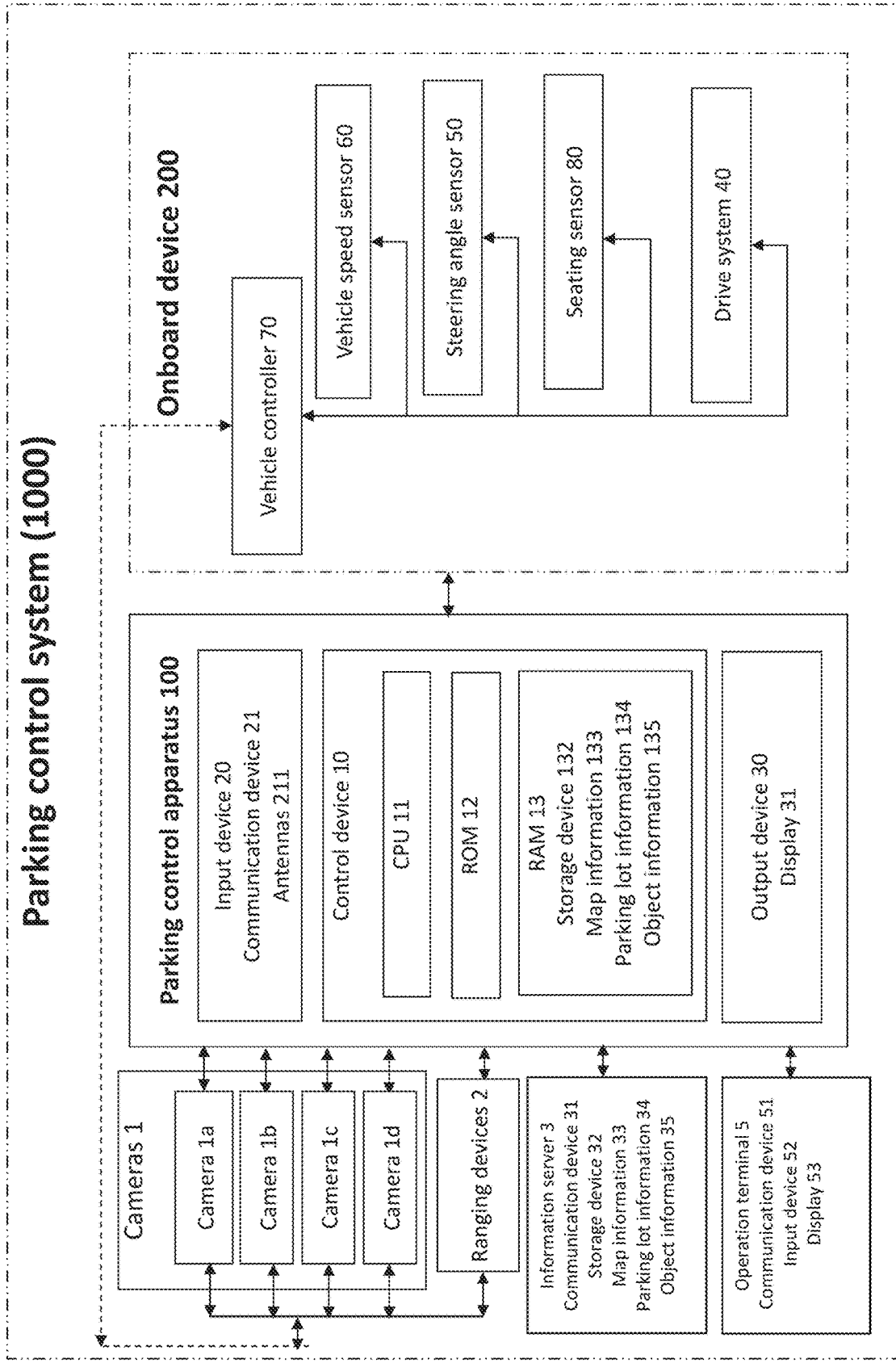
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, ranging devices 2, an information server 3, an operation terminal 5, the parking control apparatus 100, a vehicle controller 70, a drive system 40, a steering angle sensor 50, a vehicle speed sensor 60, and a seating sensor 80.

The parking control apparatus 100 according to one or more embodiments of the present invention causes a control device (ECU: Engine Control Unit) of a vehicle to execute a first control instruction (parking control instruction) for moving the vehicle as the target of control along a first route to a target parking space (parking lot), on the basis of an operation command acquired from an operator. The parking control apparatus 100 according to one or more embodiments of the present invention controls the operation of moving (parking) a vehicle V as the target of control into a target parking space on the basis of an operation command that is input from the operation terminal 5. The parking control apparatus 100 according to one or more embodiments of the present invention controls the operation of moving the vehicle V so as to make the vehicle V leave from the target parking space (so as to separate the vehicle V from the target parking space), (so that the vehicle V is/becomes distant from the target parking space), (so that the vehicle V escapes from the target parking space), on the basis of an operation command that is input to the operation terminal 5 by an operator M located outside the vehicle. One or more embodiments of the present invention will be described with reference to an exemplary case in which the operator M is located outside the vehicle, but the operator M may be located inside the vehicle interior of the vehicle V. In another case, occupants including the driver may be located inside the vehicle interior while the operator M (such as a manager of the parking lot) may be located outside the vehicle.

The operation terminal 5 is a portable computer that can be brought out to outside of the vehicle V and has an input device 52 and a communication device 51. The operation terminal 5 receives the input of an operation command made by an operator M for controlling the driving (operation) of the vehicle V for parking. The driving includes operations for parking (operations for entering a parking space and exiting the parking space). The operator M inputs instructions via the operation terminal 5. The instructions include an operation command for execution of parking. The operation command includes information on the execution/stop of parking control, selection/change of a target parking position, and selection/change of a parking route and other information necessary for parking. The operator M can also make the parking control apparatus 100 recognize the instructions including the operation command without using the operation terminal 5, such as by a gesture of the operator M (i.e., the operator M can input such instructions to the parking control apparatus 100 without using the operation terminal 5, such as by a gesture). Examples of operation commands that are input by the operator M via the operation terminal 5 include not only the operation command for executing the parking but also an evacuation command for the vehicle to leave from the target parking space.

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification number. The operation terminal 5 includes a display 53. The display 53 presents an input interface and various information items. When the display 53 is a touch panel-type display, it has a function of receiving the operation command. The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The information server 3 is an information provision device provided on a network capable of communication. The information server 3 includes a communication device 31 and a storage device 32. The storage device 32 includes readable map information 33, parking lot information 34, and object information 35. The parking control apparatus 100 and the operation terminal 5 can access the storage device 32 of the information server 3 to acquire each information item.

The parking control apparatus 100 according to one or more embodiments of the present invention includes a control device 10, an input device 20, and an output device 30. These components of the parking control apparatus 100 are connected to one another via a controller area network (CAN) or other onboard local area network (LAN) to mutually exchange information. The input device 20 includes a communication device 21. The communication device 21 receives the operation command transmitted from the external operation terminal 5 and inputs the operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. The output device 30 notifies the driver of parking control information. The display 31 according to one or more embodiments of the present invention is a touch panel-type display having an input function and an output function. When the display 31 has an input function, it serves as the input device 20. Even when the vehicle V is controlled on the basis of the operation command which is input from the operation terminal 5, an occupant (driver or passenger) can input the operation command, such as a command for emergency stop, via the input device 20.

The control device 10 of the parking control apparatus 100 according to one or more embodiments of the present invention is a computer for parking control including a read only memory (ROM) 12 that stores a parking control program, a central processing unit (CPU) 11 as an operation circuit that executes the program stored in the ROM 12 to serve as the parking control apparatus 100 according to one or more embodiments of the present invention, and a random access memory (RAM) 13 that serves as an accessible storage device.

The parking control program according to one or more embodiments of the present invention includes commands for executing a process of causing a control device of the vehicle to execute a first control instruction for moving the vehicle along a first route to a target parking space, on the basis of the operation command acquired from an operator, and a process of, when execution of the first control instruction is suspended or canceled, calculating a second route for the vehicle to leave with a predetermined distance or more from an object detected around the vehicle and causing the control device of the vehicle to execute a second control instruction for moving the vehicle along the second route.

The parking control apparatus 100 according to one or more embodiments of the present invention is a remote control-type apparatus that receives the operation command from the operation terminal 5 and controls the movement of the vehicle V to park the vehicle V into a given parking space. The occupant who operates the operation terminal 5 may be located outside the vehicle interior or may also be located inside the vehicle interior.

The parking control apparatus 100 according to one or more embodiments of the present invention may be of an autonomous (automated) control type in which the steering operation and the accelerator/brake operation are performed in an autonomous (automated) manner. The parking control apparatus 100 may also be of a semiautonomous (semiautomated) type in which the steering operation is performed in an autonomous manner while the driver performs the accelerator/brake operation.

In the parking control program according to one or more embodiments of the present invention, the user may arbitrarily select the target parking position, or the parking control apparatus 100 or the parking facility side may automatically set the target parking position.

The control device 10 of the parking control apparatus 100 according to one or more embodiments of the present invention has functions of executing a first control process of moving the vehicle along the first route to a target parking space, a determination process of determining whether or not execution of the first control process is suspended or canceled, and a second control process of, when the execution of the first control instruction is suspended or canceled, calculating the second route for the vehicle to leave with a predetermined distance or more from an object detected around the vehicle and executing a second control process of moving the vehicle along the second route. Each of the above processes is executed by cooperation of software for implementing the process and the above-described hardware.

Some processes of detecting the position of the operator M will be described with reference to FIGS. 2A to 2D. The control device 10 acquires the position of the operator M. The position of the operator M is used for calculation of an evacuation space. The position of the operator M includes information on the position on the movement plane of the vehicle V. The position of the operator M includes information on the height position. The position of the operator M may be detected on the basis of the sensor signals from sensors provided in the vehicle V or may also be obtained through detecting the position of the operation terminal 5 carried by the operator M and calculating the position of the operator M on the basis of the position the operation terminal 5. The operation terminal 5 may be provided at a predetermined position or may also be carried by the operator M. When the operation terminal 5 is provided at a predetermined position, the operator M moves to the position at which the operation terminal 5 is provided, and uses the operation terminal 5 at that position. In these cases, the position of the operation terminal 5 can be employed as the position of the operator M. In some cases, occupants including the operator M may be located inside the vehicle interior. The seating sensor 80 detects that an occupant is located inside the vehicle interior. The seating sensor 80 can detect the position at which the occupant is seated (distinction between the driver seat and the front passenger seat, distinction between the right side and the left side). The seating sensor 80 for use may be any of such sensors having a structure known at the time of filing the present application.

Figure 2A:
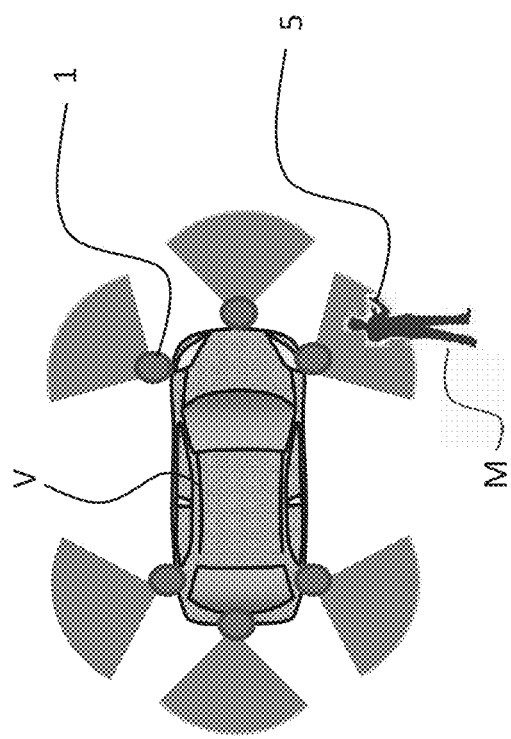
FIG. 2A is a diagram for describing a first detection scheme for the position of an operator.

As illustrated in FIG. 2A, the position of the operator M is detected on the basis of the detection results from the multiple ranging devices 2 provided in the vehicle and/or the images captured by the cameras 1. The position of the operator M can be detected on the basis of the images captured by the cameras 1a to 1d. The ranging devices 2 for use may each be a radar device, such as a millimeter-wave radar device, a laser radar device, or an ultrasonic radar device, or a sonar device. The multiple ranging devices 2 and their detection results can be identified, and the two-dimensional position and/or three-dimensional position of the operator M can therefore be detected on the basis of the detection results. The ranging devices 2 may be provided at the same positions as the cameras 1a to 1d or may also be provided at different positions. The control device 10 can also detect a gesture of the operator M on the basis of the images captured by the cameras 1a to 1d and identify the operation command associated with features of the image of the gesture.

Figure 2B:
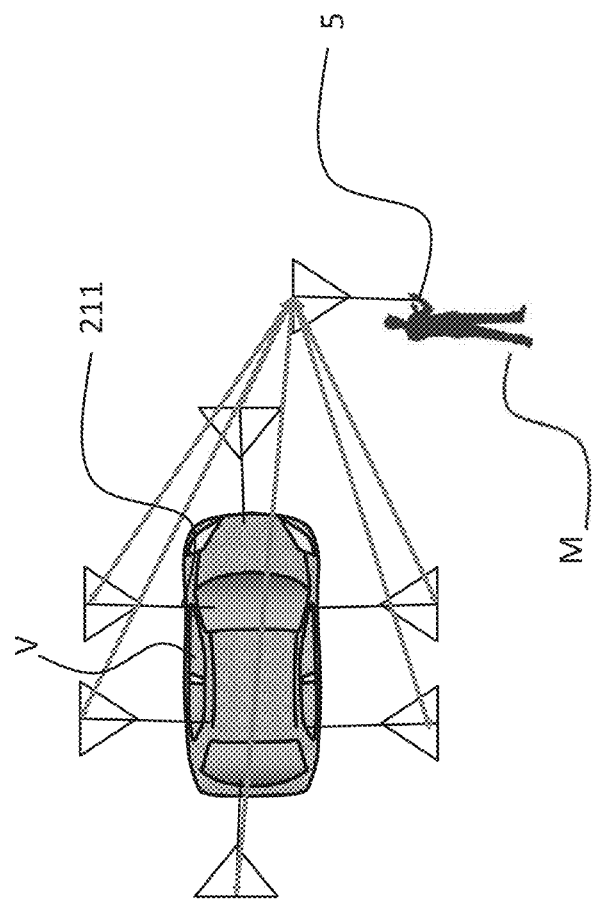
FIG. 2B is a diagram for describing a second detection scheme for the position of an operator.

As illustrated in FIG. 2B, the position of the operation terminal 5 or of the operator M carrying the operation terminal 5 may also be detected on the basis of the communication radio waves between multiple antennas 211 provided at different positions of the vehicle V and the operation terminal 5. When the multiple antennas 211 communicate with one operation terminal 5, the intensity of the received radio wave of each antenna 211 is different. The position of the operation terminal 5 can be calculated on the basis of the intensity difference between the received radio waves of the antennas 211. The two-dimensional position and/or three-dimensional position of the operation terminal 5 or of the operator M can be calculated from the intensity difference between the received radio waves of the antennas 211.

Figure 2C:
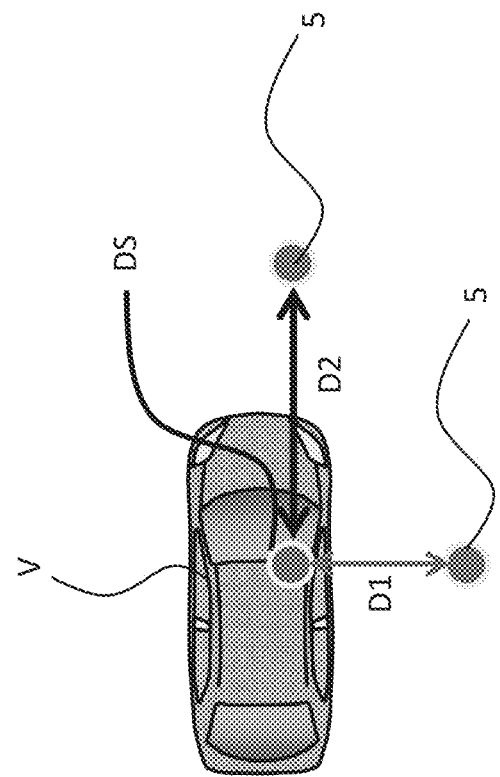
FIG. 2C is a diagram for describing a third detection scheme for the position of an operator.

As illustrated in FIG. 2C, a predetermined position (direction/distance: D1, D2) with respect to the driver seat DS of the vehicle V may be preliminarily designated as the operating position of the operator M or as the position at which the operation terminal 5 is disposed. For example, when the operator M temporarily stops the vehicle V at a designated position and gets off the vehicle V to operate the operation terminal 5 provided at the predetermined position, it is possible to calculate the initial position of the operator M with respect to the vehicle V or the initial position of the terminal 5, which is carried by the operator M, with respect to the vehicle V.

Figure 2D:
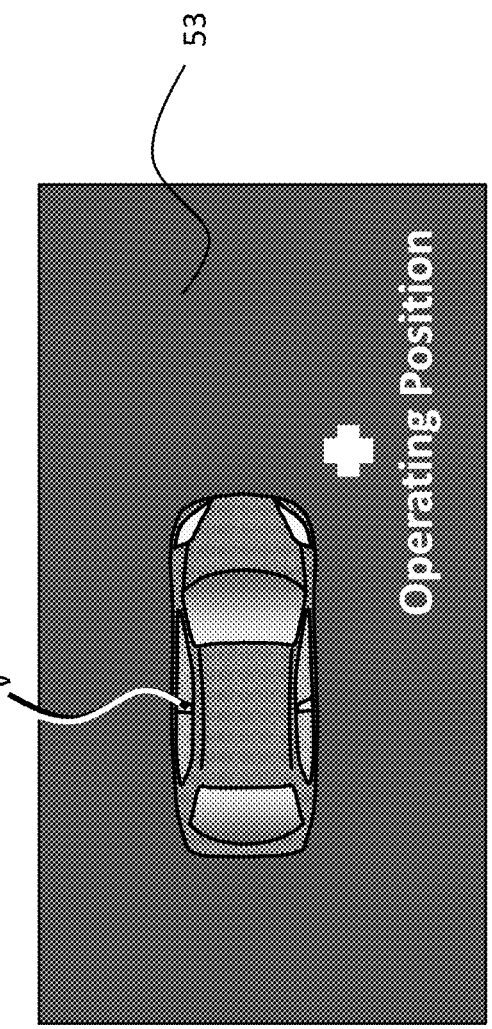
FIG. 2D is a diagram for describing a fourth detection scheme for the position of an operator.

As illustrated in FIG. 2D in a similar manner, image information representing the operating position (a position at which the operator M stands: operation position) with respect to the vehicle V is displayed on the display 53 of the operation terminal 5. This display control may be executed by an application installed on the operation terminal 5 side or may also be executed on the basis of a command from the control device 10.

The detection process for an object will be described with reference to FIGS. 3A and 3B. In one or more embodiments of the present invention, "objects" include structures, such as walls and pillars of a parking lot, installations around the vehicle, pedestrians, other vehicles, parked vehicles, etc.

Figure 3A:
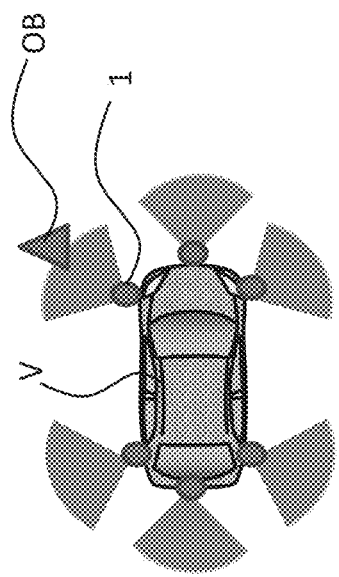
FIG. 3A is a diagram for describing a first detection scheme for an object.

As illustrated in FIG. 3A, an object is detected on the basis of the detection results from the multiple ranging devices 2 provided in the vehicle V and/or the images captured by the cameras 1. The ranging devices 2 detect the existence or absence of an object, the position of the object, the size of the object, and the distance to the object on the basis of the received signals from the radar devices. Additionally or alternatively, the existence or absence of an object, the position of the object, the size of the object, and the distance to the object may be detected on the basis of the images captured by the cameras 1a to 1d. The detection of an object may be performed using a motion stereo technique with the cameras 1a to 1d. The detection results are used to determine whether or not a parking space is empty (whether or not a vehicle is parked in the parking space).

As illustrated in FIG. 3B, objects including structures such as walls and pillars of a parking lot can be detected on the basis of the parking lot information 34 acquired from the storage device 32 of the information server 3. The parking lot information includes the location and identification number of each parking lot and positional information of passages, pillars, walls, storage spaces, etc. in the parking facility. The information server 3 may be managed by staffs of the parking lot.

The control procedure of parking control will be described below with reference to the flowchart illustrated in FIG. 4.

Figure 4:
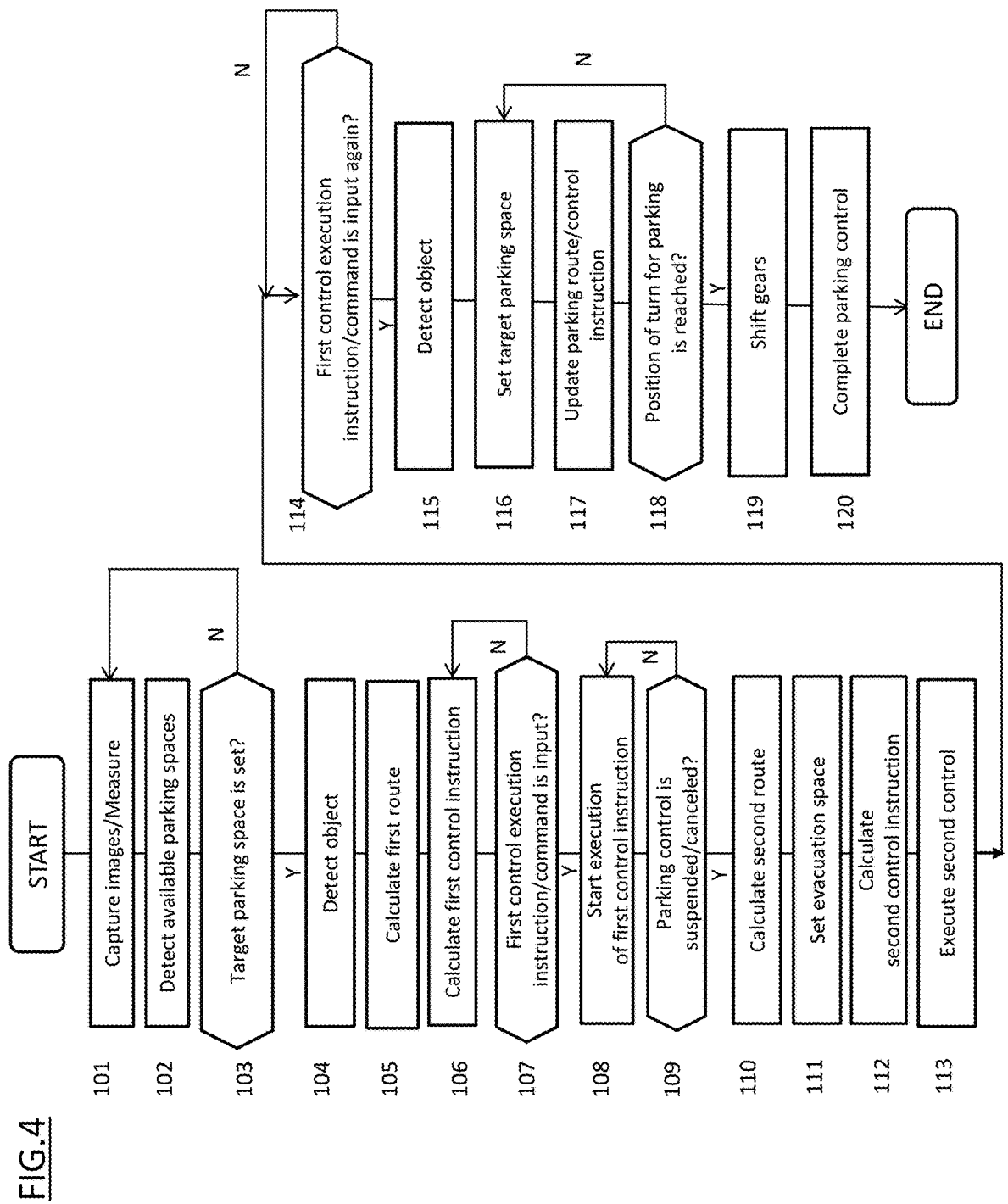
FIG. 4 is a flowchart illustrating an example of a control procedure executed by the parking control system according to one or more embodiments of the present invention.

FIG. 4 is a flowchart illustrating the control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V in an autonomous manner to a parking space on the basis of the operation command acquired from outside of the vehicle.

In step 101, the control device 10 of the parking control apparatus 100 acquires information around the vehicle at a predetermined cycle. The process of acquiring the ranging signals and the process of acquiring the captured images may be selectively executed. The control device 10 acquires the ranging signals, as necessary, from the ranging devices 2 which are attached to multiple sites of the vehicle V. The control device 10 acquires the images, as necessary, which are captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. A camera having a wide-angle lens with a wide view angle can be used as each of the cameras 1a to 1d. The cameras 1a to 1d capture images of boundary lines of parking spaces around the vehicle V and objects existing around the parking spaces. The cameras 1a to 1d may be charge-coupled device (CCD) cameras, infrared cameras, or other appropriate imaging devices.

In step 102, the control device 10 detects parking spaces into which parking is possible. The control device 10 detects frames (areas) of parking spaces on the basis of the images captured by the cameras 1a to 1d. The control device 10 detects empty parking spaces using the detection data from the ranging devices 2 and the detection data extracted from the captured images. The control device 10 detects available parking spaces from among the parking spaces. The available parking spaces are parking spaces which are empty (i.e., other vehicles are not parked) and to which routes for completing the parking can be calculated. The target parking space for parking the vehicle is specified from among the available parking spaces. In one or more embodiments of the present invention, the condition that a parking route can be calculated means that a trajectory of the route from the current position to a target parking position can be rendered on the road surface coordinates without interfering with objects (including parked vehicles).

In step 103, the control device 10 transmits the available parking spaces to the operation terminal 5, controls the display 53 to display the available parking spaces, and requests the operator M to input selection information of the target parking position for parking the vehicle V. The target parking position may be automatically selected by the control device 10 or the parking facility side. When the operation command of specifying a parking space is input to the operation terminal 5, the parking space is set as the target parking position.

In step 104, the control device 10 detects an object using the previously described scheme. Objects include pedestrians, traffic signs, road structures, cargoes, movable objects, structures that form parking spaces, curbstones that partition parking spaces, etc. Structures that form parking spaces are buildings that constitute garages, carports, and the like. The detection of objects includes the detection of obstacles that obstruct the execution of the parking control.

In step 105, the control device 10 calculates a first route to the target parking space. Any scheme known at the time of filing the present application may be used for the process of calculating the first route to the target parking space.

In step 106, the control device 10 generates a first control instruction for moving the vehicle V along the calculated first route. The control device 10 preliminarily stores the spec information of the vehicle V necessary for the control instruction. Examples of the first control instruction include operation instructions for the steering amount, steering speed, steering acceleration, shift position, speed (including zero), acceleration, and deceleration of the vehicle V, which are associated with the timing or position when the vehicle V travels along the parking route, and other operation instructions. The first control instruction includes the execution timing or execution position of the above operation instruction for the vehicle V. The instruction regarding the parking route and the operation instruction associated with the parking route are executed by the vehicle V, and the vehicle V can thereby be moved (parked) to the target parking position.

In step 107, the control device 10 receives an input of an execution instruction/command of the first control instruction from the operator M. When the execution instruction/command is input, the process proceeds to step 108, in which execution of the first control instruction is started. The execution instruction/command may be an input to a deadman switch of the operation terminal 5. The deadman switch is a switch having a function of continuing execution of the parking control process only while the operator M applies force to the switch and a function of suspending or canceling the execution of the parking control process when the force applied to the switch is removed. While the Deadman switch of the operation terminal 5 is pressed/touched, the parking control process is continuously executed.

In step 109, the control device 10 determines whether or not the first control can be continued and whether or not the execution of the first control should be suspended/canceled. The control device 10 determines whether or not the vehicle can move to the target parking space. When the execution of the first control is started, the control device 10 acquires detection information of a surrounding object (obstacle) at a predetermined cycle and determines whether or not the vehicle V1 can travel along the first route. When the execution of the first control is started, the control device 10 acquires detection information of the target parking space at a predetermined cycle and determines whether or not the vehicle V1 can enter the target parking space. The control device 10 determines whether or not the vehicle V1 can travel along the first route without being obstructed by the existence of an object. When the travel along the first route is not possible, a determination is made that the execution of the first control should be suspended or canceled. When the control device 10 determines that the execution of the first control should be suspended or canceled, the process proceeds to step 110.

In step 110, the control device 10 calculates a second route. The second route is a route for the vehicle V1 to leave from the target parking space (a route for separating the vehicle V1 from the target parking space), (a route for making a space between vehicle V1 and target parking space), (a route for making the vehicle V1 escape from the target parking space). The second route according to one or more embodiments of the present invention is used in a rescue mode (return mode) for return/recovery from the state in which the parking control is suspended or canceled. The rescue mode refers to a process that is executed as emergency avoidance when continuation of the parking control process is difficult and the movement to the target parking position is suspended/canceled. The rescue mode is a process of moving the subject vehicle V1 so as to make the subject vehicle V1 leave from the target parking space (so as to separate the subject vehicle V1 from the target parking space), (so that the subject vehicle V1 is/becomes distant from the target parking space), (so that the subject vehicle V1 escapes from the target parking space) which has been set before the execution of the rescue mode. The control device 10 may calculate a trajectory for avoiding an object that causes the movement to the target parking position to be suspended/canceled as the second route (route in the rescue mode). As will be understood, the second route may be the same as the first route to the target parking space, and the control device 10 may reverse the travel direction along the route to calculate the second route for moving the subject vehicle V1 in the opposite direction to the first route. The second route calculated in the rescue mode may be a trajectory for moving (returning) to the position at which the parking process was started.

In step 111, the control device 10 sets an evacuation space. In one or more embodiments of the present invention, the control device 10 may set the evacuation space at a position left with a predetermined distance or more from an object and calculate the second route to the set evacuation space. The second route is obtained after the evacuation space is set, and the vehicle V1 can therefore be guided to the position left with the predetermined distance or more from the object. By making the vehicle V1 leave with the predetermined distance or more from the object (by leaving the evacuation space with the predetermined distance or more from the object), a clearance for a person to pass through can be formed. A plurality of clearances may be set for one evacuation space, or only one clearance may be set. That is, the evacuation space may be set such that a clearance equal to or more than a predetermined distance can be ensured only on the right side or the left side of the vehicle V1, or the evacuation space may be set such that clearances equal to or more than a predetermined distance can be ensured on both the right side and the left side of the vehicle V1. The predetermined distance in one or more embodiments of the present invention can be set in accordance with the attribute of the object OB. When the object is a structure, the predetermined distance may be set to a distance that allows a person to pass through. A distance that allows a person to pass through can be set to 40 cm to 70 cm, 50 cm to 65 cm, and preferably 60 cm.

The "predetermined distance" between an object and the evacuation space (the position at which the vehicle V1 is located after the first control) may be defined as a distance between the object and an opening part of the vehicle V1. Examples of the opening part include a side opening part provided on the side of the vehicle V1 and a rear opening part provided on the rear of the vehicle. Examples of the side opening part include a pull-type side door and a slide-type side door. The predetermined distance may be set to a distance in accordance with the size and/or the movable range (the maximum distance at the time of opening) of each side door of the vehicle V1. Different predetermined distances may be set for a pull-type door vehicle V1 and a slide-type door vehicle V1. As for the predetermined distance for a side opening part of the vehicle V1, the distance for a right-side opening part and the distance for a left-side opening part may be different values. The "predetermined distance" between the object and the evacuation space (or the opening part) may be set in accordance with a space required for an occupant to open the door and get into the vehicle V1. The space required for getting into the vehicle may be preliminarily defined in accordance with the vehicle type and stored in the storage device 132 so as to be readable. The storage device 132 includes readable map information 133, parking lot information 134, and object information 135.

The rear opening part is a trunk door or a hatchback door. Examples of the rear opening part include a pull-type back door and a hatch-type door. The predetermined distance may be set to a distance in accordance with the size and/or the movable range (the maximum distance at the time of opening) of each back door of the vehicle V1. Different predetermined distances may be set for a pull-type door vehicle V1 and a hatch-type door vehicle V1. The predetermined distance between the object and the opening part may be set in accordance with a space required for an occupant to enter the space between the back door (opening part) and the object and open the back door to take out a baggage from the trunk or rear seat. The space required for handling a baggage in the trunk or rear seat may be preliminarily defined in accordance with the vehicle type and stored in the storage device 132 so as to be readable. As for the back door, different predetermined distances may be set for a trunk-type vehicle V1 and a hatchback-type vehicle V1.

When a plurality of candidates for the evacuation space can be set, the evacuation space may be set so as to be able to ensure the longest predetermined distance (a clearance having the widest width, the widest clearance), or the evacuation space may also be set to a position closest to the operator M. The position of the operator M can be acquired using the previously described scheme. When a plurality of candidates for the evacuation space can be set, the evacuation space closest to the position of the occupant detected by the seating sensor 80 can be selected and set. When the occupant is seated in the driver seat, the evacuation space may be set closest to the opening part on the driver seat side.

In one or more embodiments of the present invention, when the execution of the first control instruction is suspended or canceled, the control device 10 sets as the second route a route for the vehicle V1 to leave with a predetermined distance or more from the object detected around the vehicle V1. Thus, by making the vehicle V1 leave with a predetermined distance or more from the object, the operator can pass through a space between the vehicle V1 and the object.

When a vehicle is parked into a parking space surrounded by walls, such as a garage or a carport, the parking control process being executed may be suspended or canceled if an object is detected in the garage. In this case, if the vehicle is stopped without a sufficient space between the wall (object) and the vehicle, the operator M cannot enter the parking space to confirm and move the object detected in the garage.

Figure 5:
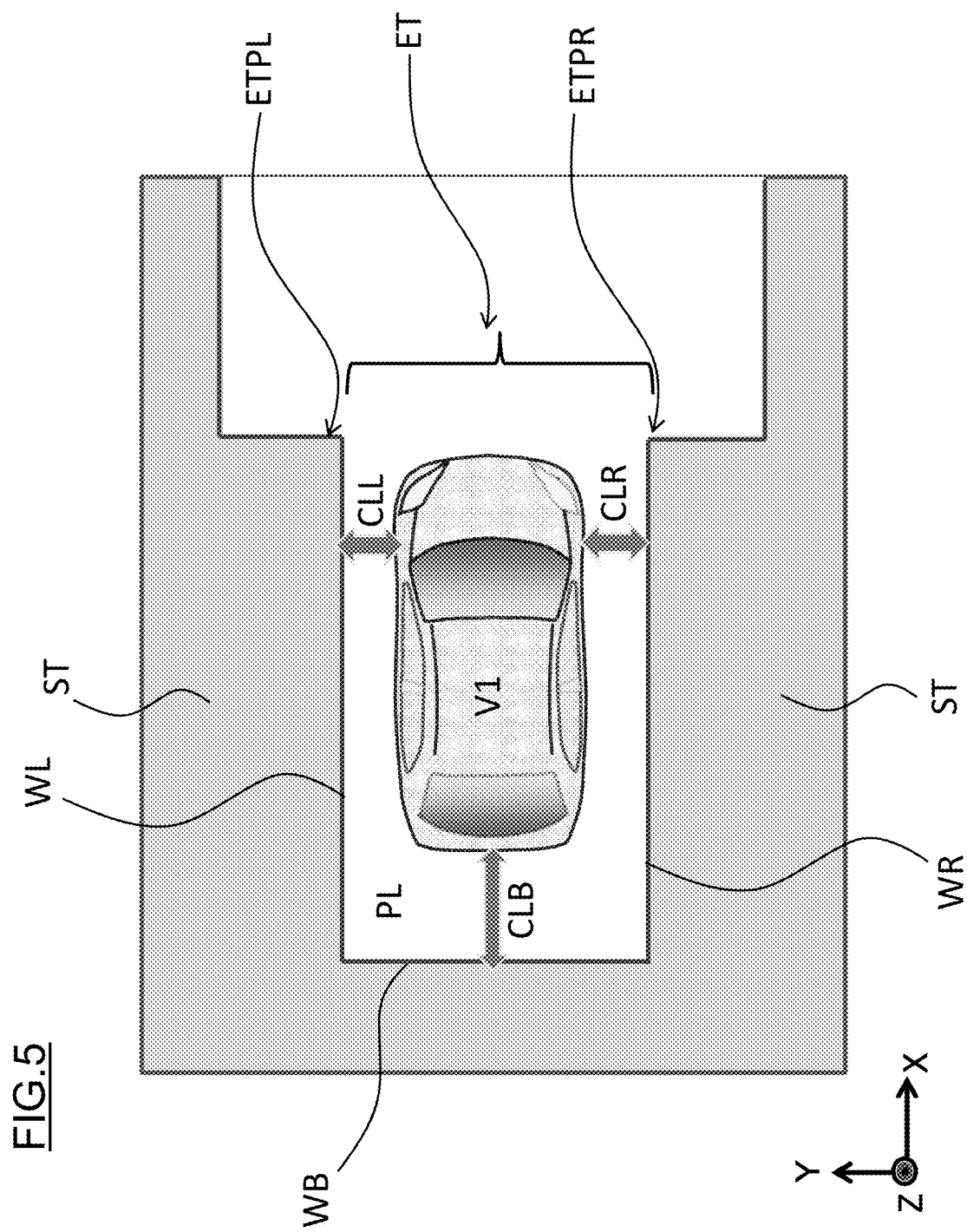
FIG. 5 is a diagram illustrating an example of a target parking space.

FIG. 5 illustrates an example of a parking space PL formed by a structure ST. The structure ST has a right-side wall WR, a left-side wall WL, and a rear wall WB, and these walls define the parking space PL. The structure ST also forms an entrance ET that is an opening part opened to the outside. The entrance ET includes gatepost structures ETPL and ETPR that are right and left end parts of the opening part. A space between the gatepost structures ETPL and ETPR is the opening part through which the vehicle enters and exits. The entrance ET is an entrance port/exit port to/from the parking space PL. FIG. 5 illustrates a state in which the vehicle V1 is parked in the parking space PL. The vehicle V1 is left with certain distances from the structure ST as an object. A clearance CLR is formed between the right-side wall WR of the structure ST and the vehicle V1, a clearance CLL is formed between the left-side wall WL and the vehicle V1, and a clearance CLB is formed between the rear wall WB and the vehicle V1.

Garages and carports may be used as storehouses and may store goods therein. When the suspension of the parking control (first control) is due to the presence of a movable object, the operator M can move (take away) the object thereby to allow the parking control (first control) to be executed again. However, if a person cannot enter the parking space, he/she cannot remove the object in the first place. Moreover, if the vehicle is stopped without a sufficient space between the wall (object) and the vehicle, the operator M cannot get into the vehicle V1 to drive (perform the parking operation) for him/herself and also cannot take out a baggage from the vehicle V1. In the autonomous parking control process, it is necessary to determine whether or not to continue the parking control from the viewpoint of ensuring safety, and the parking control process may of course be suspended or canceled. The above situations, that is, the situations in which it is not possible to enter the parking space for taking away the object, get on the vehicle V1, and open an opening part such as a door or a trunk of the vehicle V1 when the vehicle V1 is stopped due to the suspension/cancellation of the first control, deteriorate the evaluation of convenience and reliability of the parking control apparatus itself which performs the autonomous parking.

In one or more embodiments of the present invention, when the execution of the first control instruction is suspended or canceled, the second route for the vehicle V1 to leave with a predetermined distance or more from the object detected around the vehicle V1 is calculated, and it is therefore possible to prevent the occurrence of a situation in which it is not possible to enter the parking space, get on the vehicle V1, or access an opening part such as a door or a trunk of the vehicle V1 when the vehicle V1 is stopped.

In one or more embodiments of the present invention, the process of calculating the second route may be executed when the following condition is satisfied. Specifically, when the execution of the first control instruction for the vehicle V1 is suspended or canceled at a position at which at least part of the vehicle V1 belongs to the target parking space, the control device 10 is caused to execute the second control instruction for moving the vehicle along the second route. The control device 10 compares the existence area (XY coordinates) of the vehicle V1 with the area (XY coordinates) of the target parking space at the timing at which the execution of the first control instruction is suspended or canceled, and when the areas partially overlap each other, the control device 10 calculates the second route and executes the second control (rescue mode). When the vehicle V1 makes a stop at a position at which at least part of the vehicle V1 belongs to the target parking space, it is highly possible to fall into a state that cannot be handled, such as a state in which it is not possible to enter the parking space, get on the vehicle V1, or access an opening part such as a door or a trunk of the vehicle V1 when the vehicle V1 is stopped. In one or more embodiments of the present invention, the second route is calculated when the possibility of the occurrence of such a state that cannot be handled is high, and it is therefore possible to prevent the execution of the second control (rescue mode) which is not necessary in a situation that cannot be handled.

In step 112, the control device 10 generates a second control instruction for moving the vehicle V along the calculated second route. The control device 10 preliminarily stores the spec information of the vehicle V necessary for the control instruction. Examples of the second control instruction include operation instructions for the steering amount, steering speed, steering acceleration, shift position, speed (including zero), acceleration, and deceleration of the vehicle V, which are associated with the timing or position when the vehicle V travels along the parking route, and other operation instructions. The second control instruction includes the execution timing or execution position of the above operation instruction for the vehicle V. The instruction regarding the parking route and the operation instruction associated with the parking route are executed by the vehicle V, and the vehicle V can thereby be moved (parked) to the target parking position. When the execution command for the second control is input, the control device 10 executes the process of moving the subject vehicle V1 along the second route for leaving from the target parking space. The moving direction and moving distance of the trajectory for leaving from the target parking space are not limited.

Specific control examples will be described below with reference to the drawings. The following description is based on an exemplary case in which the vehicle V1 is parked into the parking space PL illustrated in FIG. 5.

As described above, when the execution of the first control instruction is suspended or canceled, the control device 10 calculates the second route for the vehicle V1 to leave with a predetermined distance or more from the object detected around the vehicle V1 and controls the vehicle V1 to move along the second route.

(1) The control device 10 may calculate the second route for guiding the vehicle V1 to the evacuation space in which the structure ST (object) of the parking space is left with a predetermined distance or more from the vehicle V1.

Figure 6A:
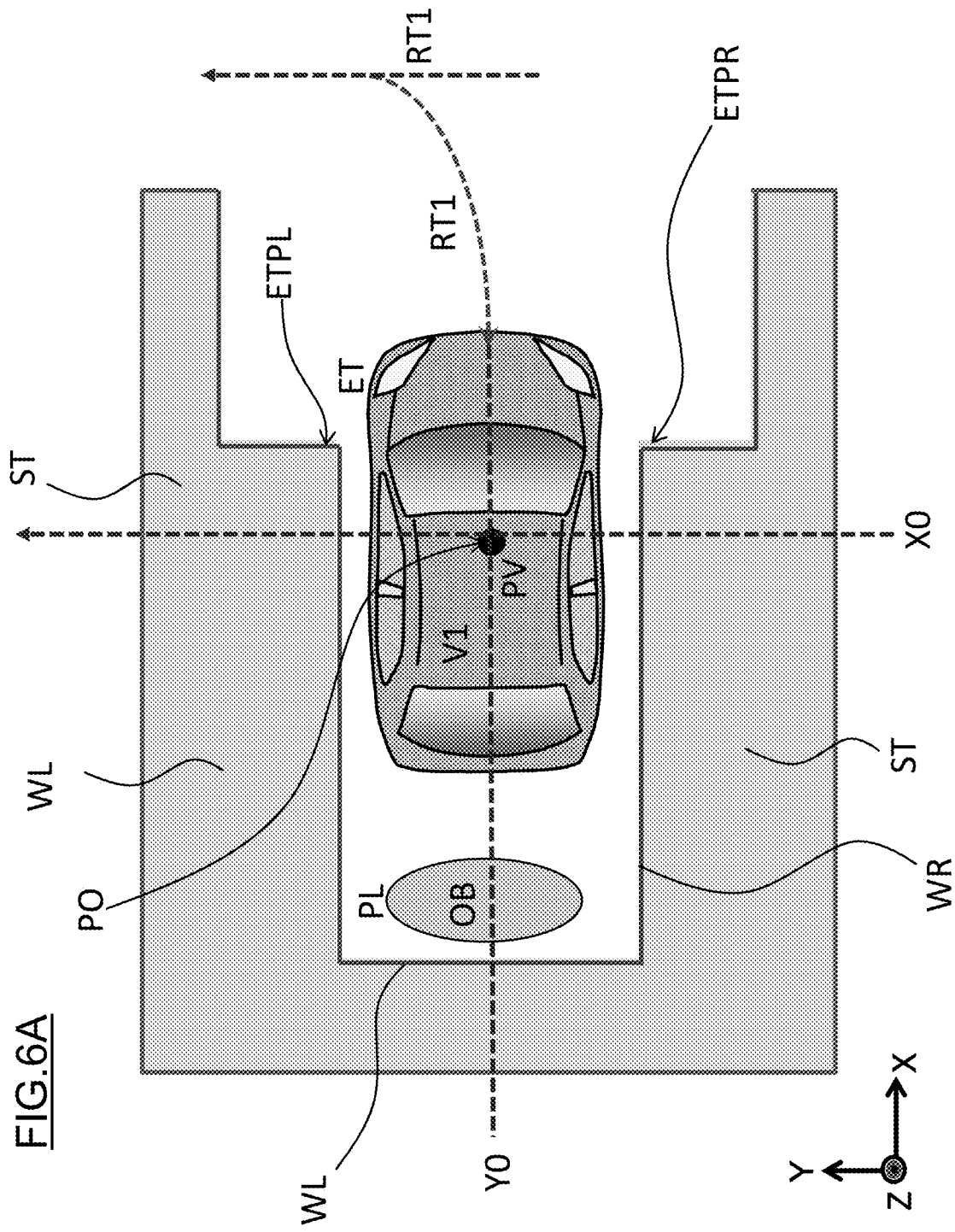
FIG. 6A is a diagram for describing a state in which the execution of the first control is canceled and the vehicle makes a stop.

FIG. 6A is a diagram when viewing from above a state in which the vehicle V1 is parked into the target parking space PL along the first route RT1. An object OB is present at the back of the parking space PL; therefore, the execution of the first control as the parking control cannot be continued and the vehicle V1 is controlled to make a stop. At this time, a reference position PV of the vehicle V1 is located at coordinates PO (X0 and Y0). The reference position of the vehicle V1 is not particularly limited and is set at a predetermined position of the vehicle V1.

Figure 6B:
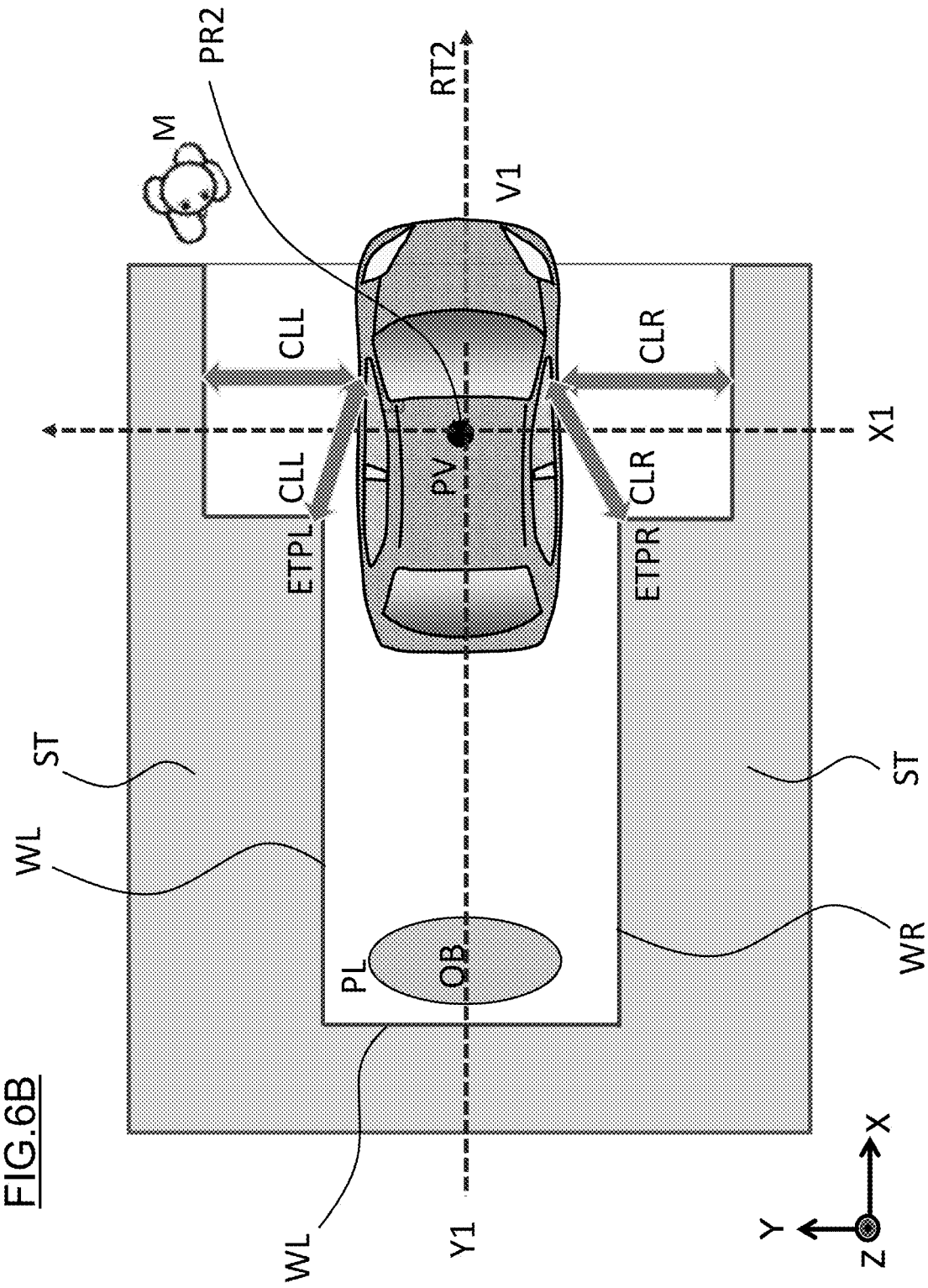
FIG. 6B is a first diagram for describing a state in which the execution of the second control is completed.

FIG. 6B is a diagram when viewing from above a state in which the vehicle V1 is moved along the second route RT2 for the vehicle V1 to leave from the target parking space PL. The second route is calculated to guide the vehicle V1 to the evacuation space in which the structure ST (object) of the parking space is left with a predetermined distance or more from the vehicle V1. The reference position PV of the vehicle V1 located in the evacuation space after the execution of the second control is located at coordinates PR2 (X1 and Y1). Clearances are formed between the vehicle V1 located in the evacuation space and the structure ST. The right-side clearance CLR and the left-side clearance CLL, which are formed in the lateral direction (wheel axis direction) of the vehicle V1, have a predetermined distance or more. The reference position PV of the vehicle V1 is located at the coordinates PR2 (X1 and Y1) when the second control is executed to move the vehicle V1 to the evacuation space. Compared with the position of the vehicle V1 represented by the coordinates PO (X0 and Y0) illustrated in FIG. 6A, the position of the vehicle V1 is shifted in the vehicle travel direction on the X axis.

Additionally or alternatively, the evacuation space may be set such that the distances between predetermined positions of the vehicle V1 and the gatepost structures ETPL and ETPR, which form the entrance of the parking space PL, are not less than a predetermined distance, and the vehicle V1 may be moved to the evacuation space. The predetermined positions of the vehicle V1 are not particularly limited, but in this example, the predetermined positions are set at the pivot axes of doors. Clearances are formed between the entrance ET of the parking space PL and opening parts of the vehicle V1 and it is therefore possible to ensure an entry route into the parking space PL.

In the state in which the first control is canceled as illustrated in FIG. 6A, the distances between the vehicle V1 and the structure ST are short, and the operator M cannot enter the far side of the parking space PL and also cannot confirm the state of the object OB In contrast, in the state in which the second control is executed as illustrated in FIG. 6B, the distances between the vehicle V1 and the structure ST are not less than the predetermined distance, and the operator M can enter the far side of the parking space PL and can also confirm the state of the object OB, so the object OB can be removed if necessary.

The right-side clearance CLR and the left-side clearance CLL may be the same distance or may also be different distances. The control device 10 according to one or more embodiments of the present invention detects the position of the operator M and forms a clearance having a predetermined distance or more between the structure ST and an opening part closest to the position of the operator M among a plurality of opening parts of the vehicle V1. The opening parts of the vehicle V1 include side opening parts and a rear opening part. The side opening parts are side doors. Examples of the rear opening part include a trunk door and a hatchback door. In the example illustrated in FIGS. 6A and 6B, the clearance CLL between the left-side door closest to the operator M and the structure ST is set as the control target (which is controlled to have a predetermined distance or more). In this case, the width of the clearance CLL may be set larger than the width of the clearance CLR. By forming a passage (clearance) in a place through which the operator M can easily access the opening part (such as a door or a trunk), the user convenience can be improved. In this case, the coordinate value of Y1 passing through the reference position PV of the vehicle V1 shifts in the +Y/−Y direction from the center of the entrance. As illustrated in FIG. 6C, the clearances CLL and CLR may be formed such that the distances between the trunk portion (rear opening part) of the vehicle V1 and the gatepost structures ETPL and ETPR, which form the entrance, are not less than a predetermined distance.

(2) The control device 10 may calculate the second route for guiding the vehicle V1 to the evacuation space in which the structure ST (object) of the parking space is left with a predetermined distance or more from an opening part of the vehicle V1.

Figure 7A:
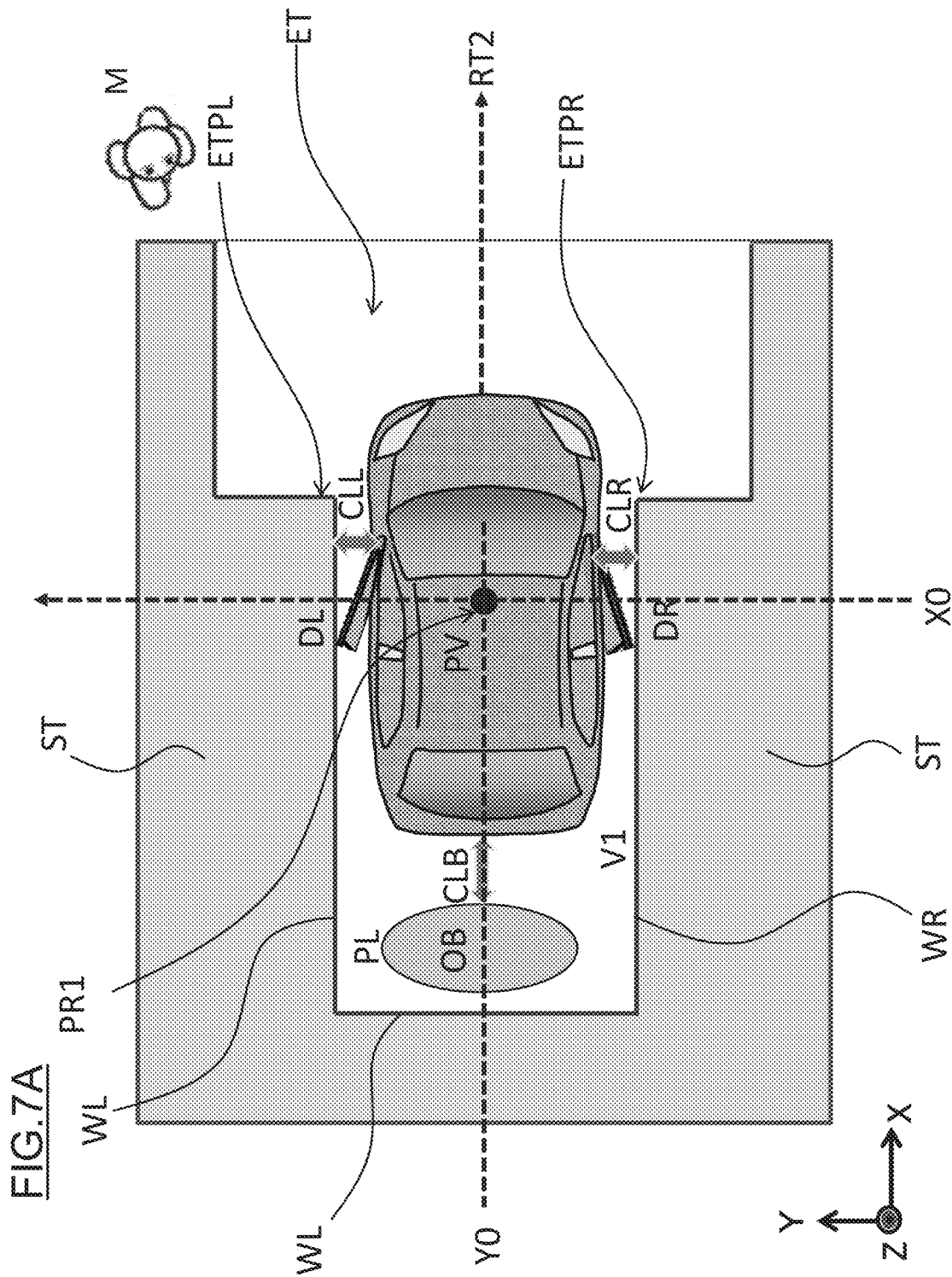
FIG. 7A is a diagram for describing a state in which the execution of the first control is canceled and the vehicle makes a stop.

FIG. 7A is a diagram when viewing from above a state in which the vehicle V1 is parked into the target parking space PL along the first route RT1. An object OB is present at the back of the parking space PL; therefore, the execution of the first control as the parking control cannot be continued and the vehicle V1 is controlled to make a stop. At this time, the reference position PV of the vehicle V1 is located at coordinates PR1 (X0 and Y0). The reference position of the vehicle V1 is not particularly limited and is set at a predetermined position of the vehicle V1. As illustrated in the figure, the distances CLL and CLR between the structure ST and the vehicle V1 are less than a predetermined distance and, therefore, the opening parts cannot be opened.

Figure 7B:
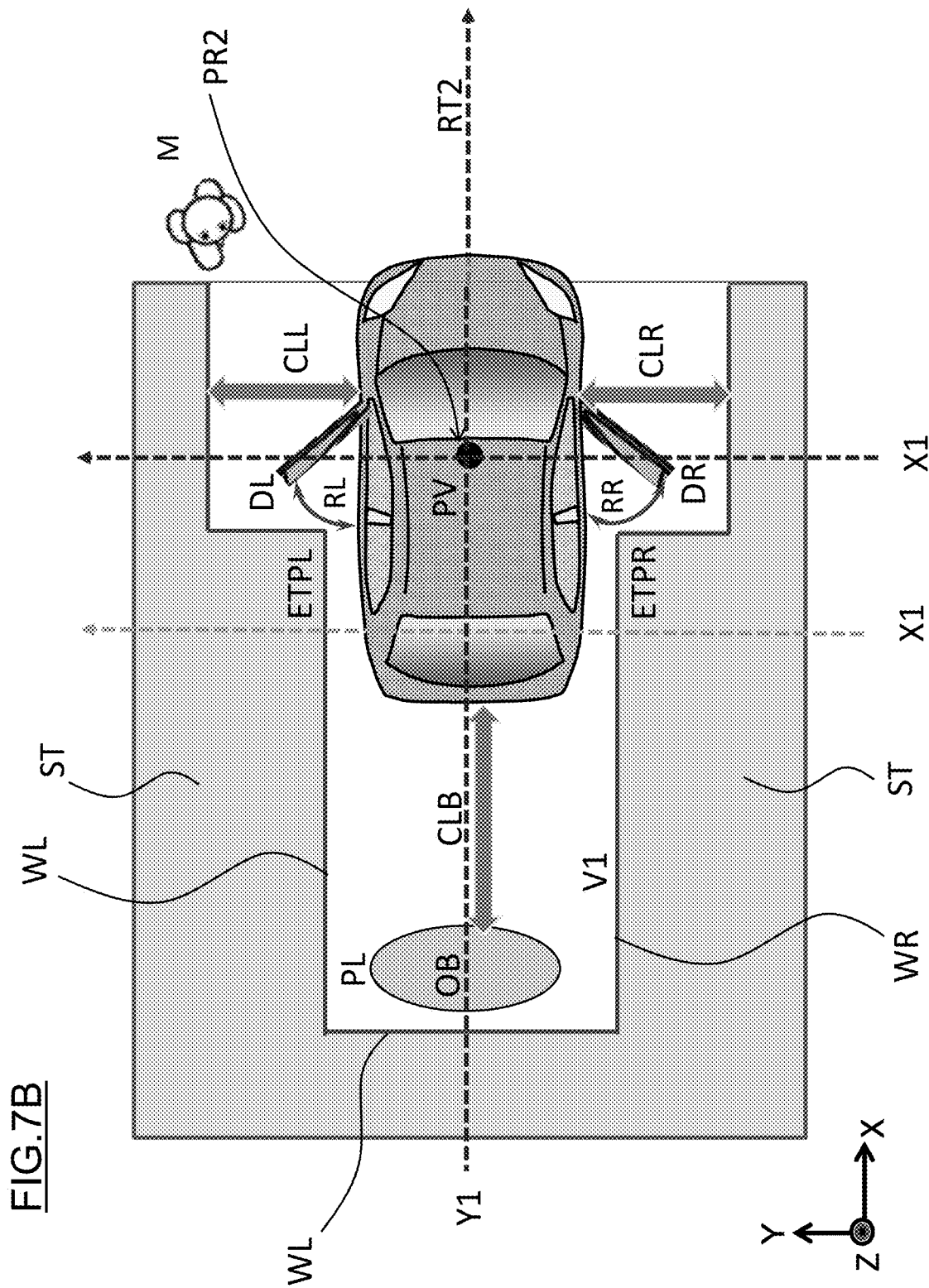
FIG. 7B is a diagram for describing a state in which the execution of the second control is completed.

FIG. 7B is a diagram when viewing from above a state in which the vehicle V1 is moved along the second route RT2 for the vehicle V1 to leave from the target parking space PL. The second route is calculated to guide the vehicle V1 to the evacuation space in which the structure ST (object) of the parking space is left with a predetermined distance or more from the opening parts of the vehicle V1. The reference position PV of the vehicle V1 located in the evacuation space after the execution of the second control is located at coordinates PR2 (X1 and Y1). Clearances are formed between the vehicle V1 located in the evacuation space and the structure ST. The right-side clearance CLR and the left-side clearance CLL, which are formed in the lateral direction (wheel axis direction) of the vehicle V1, have a predetermined distance or more. Additionally or alternatively, the evacuation space may be set such that the distances between the pivot axes of doors of the vehicle V1 and the gatepost structures ETPL and ETPR, which form the entrance of the parking space PL, are not less than a predetermined distance, and the vehicle V1 may be moved to the evacuation space. The vehicle V1 moves to the evacuation space thereby to allow the right-side door DR to be moved in a range RR and also allow the left-side door DL to be moved in a range RL. The rear clearance CLB formed in the longitudinal direction (vehicle length direction) of the vehicle V1 is not less than a predetermined distance. The reference position PV of the vehicle V1 is located at the coordinates PR2 (X1 and Y1) when the second control is executed to move the vehicle V1 to the evacuation space. Compared with the position of the vehicle V1 represented by the coordinates PR1 (X0 and Y0) illustrated in FIG. 7A, the position of the vehicle V1 is shifted in the vehicle travel direction on the X axis.

In the state in which the first control is canceled as illustrated in FIG. 7A, the distances between the vehicle V1 and the structure ST are short, and the operator M cannot open the doors of the vehicle V1, cannot get into the vehicle V1 to drive the vehicle V1, and cannot take out a baggage from the vehicle. In contrast, in the state in which the second control is executed as illustrated in FIG. 7B, the distances between the vehicle V1 and the structure ST are not less than the predetermined distance, and the operator M can get into the vehicle V1 to drive the vehicle V1, can take out a baggage from the vehicle, and can move the vehicle V1.

The right-side clearance CLR and the left-side clearance CLL may be the same distance or may also be different distances. The control device 10 according to one or more embodiments of the present invention detects the position of the operator M and forms a clearance having a predetermined distance or more between the structure ST and an opening part closest to the position of the operator M among a plurality of opening parts of the vehicle V1.

The opening parts of the vehicle V1 include side opening parts. The side opening parts are side doors. The clearances are formed such that an object is left with a predetermined distance or more from a side opening part of the vehicle V1, and the operator can therefore get into the vehicle V1 from the side opening part to drive the vehicle V1. The opening parts of the vehicle V1 include a rear opening part. Examples of the rear opening part include a trunk door and a hatchback door. The clearances are formed such that an object is left with a predetermined distance or more from the rear opening part of the vehicle V1, and the operator can therefore take out a baggage or the like from the rear opening part.

In the example illustrated in FIGS. 7A and 7B, the clearance CLL between the left-side door closest to the operator M and the structure ST is set as the control target (which is controlled to have a predetermined distance or more). In this case, the width of the clearance CLL may be set larger than the width of the clearance CLR. By forming a passage (clearance) in a place through which the operator M can easily access the opening part (such as a door or a trunk), the user convenience can be improved. In this case, the coordinate value of Y1 passing through the reference position PV of the vehicle V1 shifts in the +Y/−Y direction from the center of the entrance.

(3) The control device 10 may calculate the second route for guiding the vehicle V1 to the evacuation space at which another vehicle (object) is left with a predetermined distance or more from an opening part of the vehicle V1.

Figure 8A:
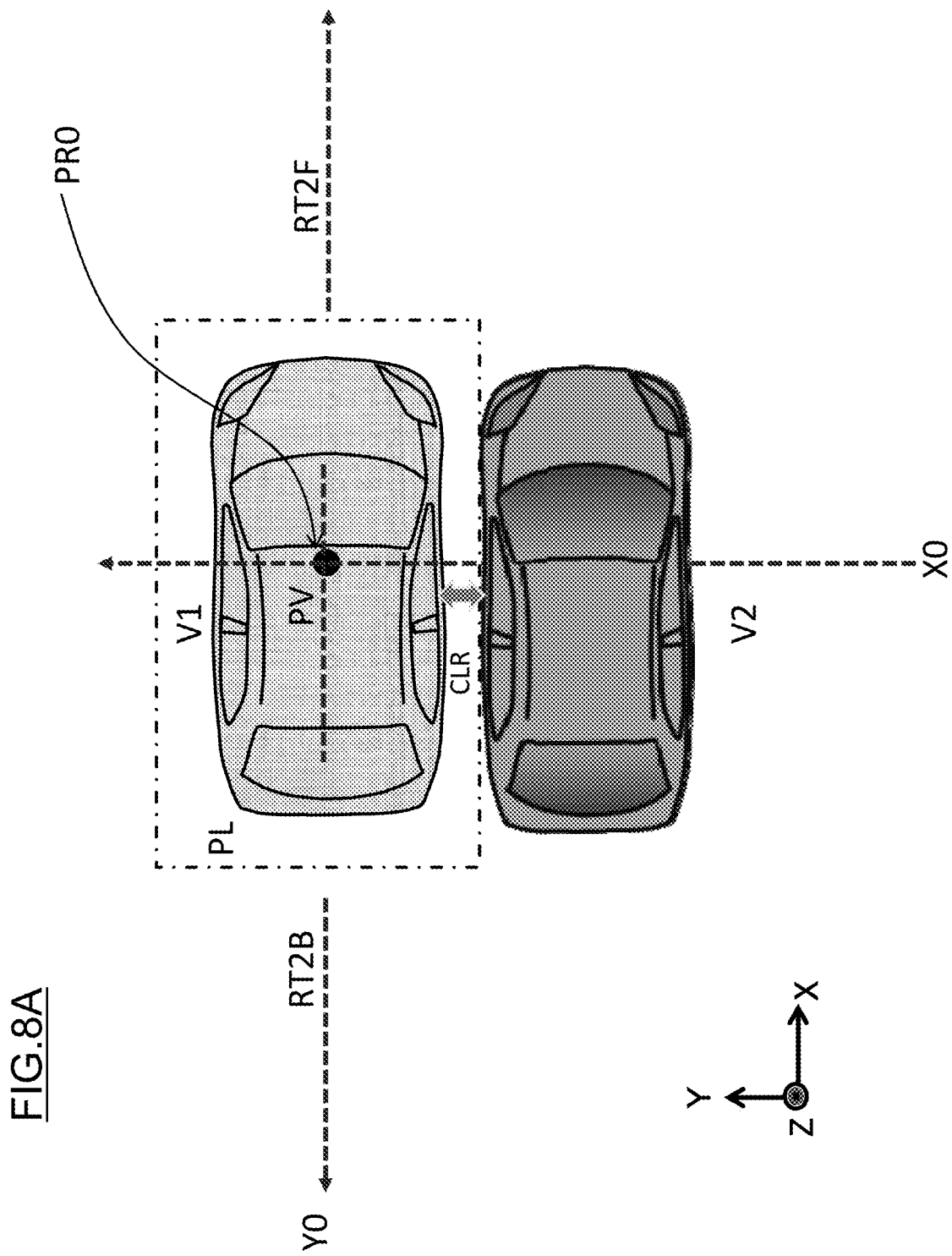
FIG. 8A is a diagram for describing a state in which the execution of the first control is canceled and the vehicle makes a stop.
Figure 8B:
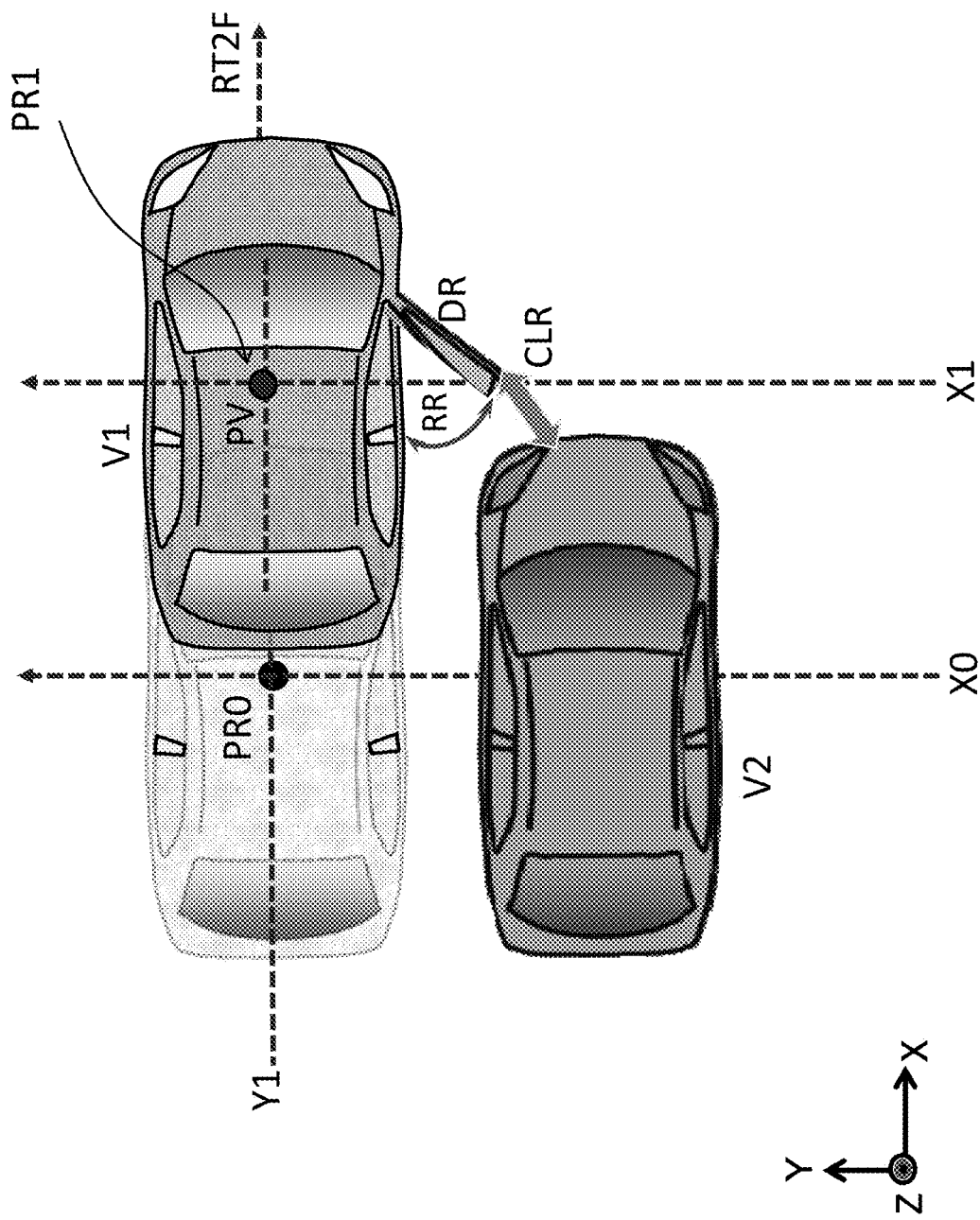
FIG. 8B is a first diagram for describing a state in which the execution of the second control is completed.
Figure 8C:
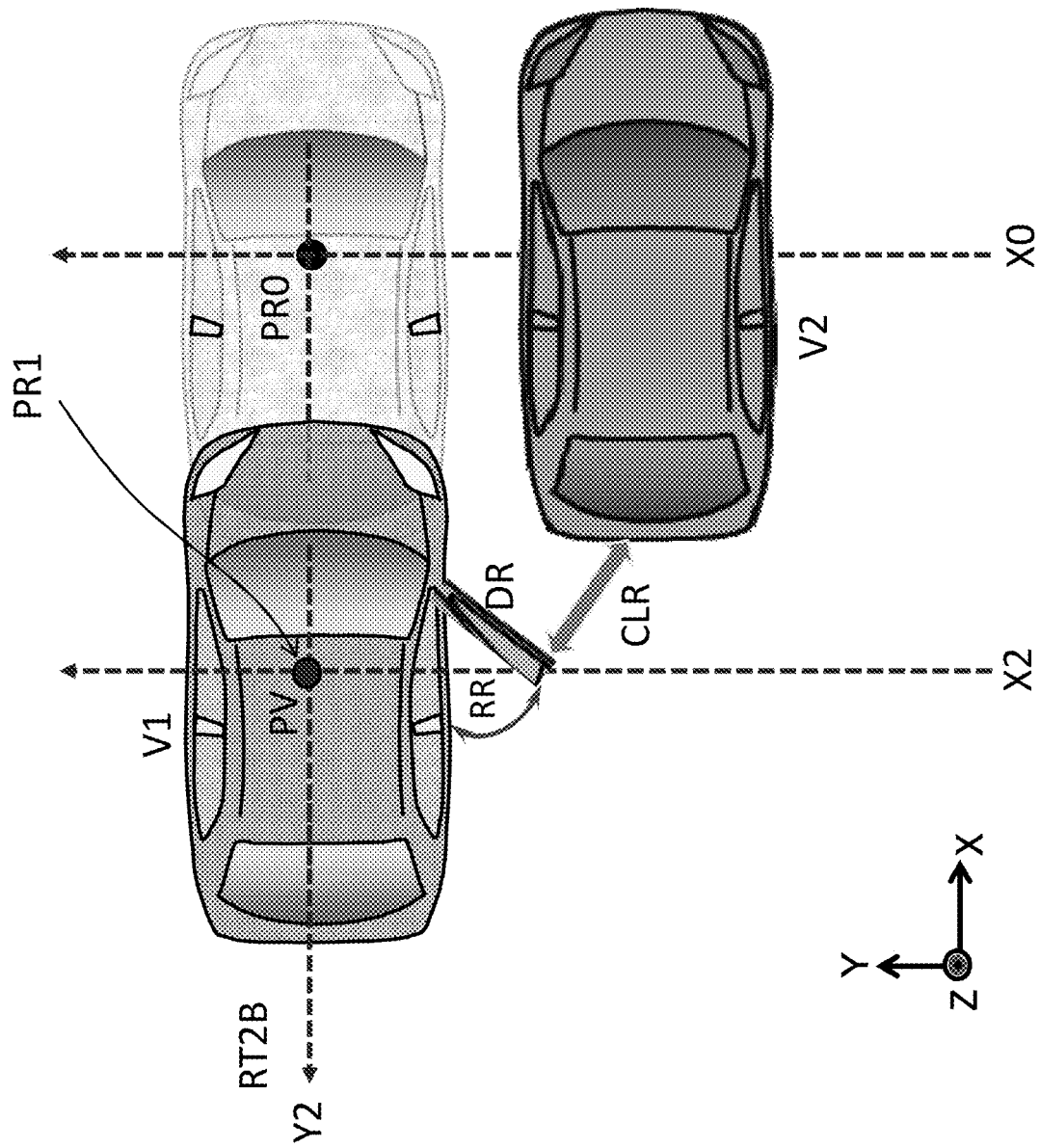
FIG. 8C is a second diagram for describing a state in which the execution of the second control is completed.

With reference to FIGS. 8A to 8C, the description will be made for the first control and the second control when another vehicle V2 is present next to the vehicle V1 to be parked in a right-angle parking form.

FIG. 8A is a prediction diagram of a state in which the vehicle V1 is parked in the target parking space PL along the first route RT1. Another vehicle V2 is present next to the target parking space PL. When the existence areas of the target parking space PL and the other vehicle V2 overlap or when the distance between the target parking space PL and the other vehicle V2 is less than a predetermined distance, the execution of the first control is difficult and the control device 10 therefore determines to suspend/cancel the execution of the first control instruction. The control device 10 may determine to suspend/cancel the execution of the first control instruction when the distance between the target parking space PL and the other vehicle V2 is short and it is difficult to open the side door of the vehicle V1 after the execution of the first control. At this time, the reference position PV of the vehicle V1 is located at coordinates PR0 (X0 and Y0). As illustrated in the figure, the distance CLR between the other vehicle V2 (object) and the vehicle V1 is less than a predetermined distance and, therefore, the opening part cannot be opened.

FIG. 8B is a diagram when viewing from above a state in which the vehicle V1 is moved forward along a second route RT2F for the vehicle V1 to leave from the target parking space PL. The second route is calculated to guide the vehicle V1 to the evacuation space at which the other vehicle V2 (object) is left with a predetermined distance or more from the opening part of the vehicle V1. The reference position PV of the vehicle V1 located in the evacuation space after the execution of the second control is located at coordinates PR1 (X1 and Y1). A clearance is formed between the vehicle V1 located in the evacuation space and the other vehicle V2. The clearance CLR formed between the door DR of the vehicle V1 and the other vehicle V2 is not less than a predetermined distance. The vehicle V1 moves to the evacuation space thereby to allow the right-side door DR to be moved in a range RR. The reference position PV of the vehicle V1 is located at the coordinates PR1 (X1 and Y1) when the second control is executed to move the vehicle V1 to the evacuation space. Compared with the position of the vehicle V1 represented by the coordinates PR0 (X0 and Y0) illustrated in FIG. 8A, the position of the vehicle V1 is shifted in the vehicle travel direction on the X axis.

FIG. 8C is a diagram when viewing from above a state in which the vehicle V1 is moved backward along a second route RT2B for the vehicle V1 to leave from the target parking space PL. The second route is calculated to guide the vehicle V1 to the evacuation space at which the other vehicle V2 (object) is left with a predetermined distance or more from the opening part of the vehicle V1. The reference position PV of the vehicle V1 located in the evacuation space after the execution of the second control is located at coordinates PR1 (X2 and Y2). A clearance CLR is formed between the door DR of the vehicle V1 located in the evacuation space and the other vehicle V2 (object). The right-side clearance CLR formed between the door DR of the vehicle V1 and the other vehicle V2 is not less than a predetermined distance. The vehicle V1 moves to the evacuation space thereby to allow the right-side door DR to be moved in the range RR. The reference position PV of the vehicle V1 is located at the coordinates PR1 (X2 and Y2) when the second control is executed to move the vehicle V1 to the evacuation space. Compared with the position of the vehicle V1 represented by the coordinates PR0 (X0 and Y0) illustrated in FIG. 8A, the position of the vehicle V1 is shifted to the rear side opposite to the vehicle travel direction on the X axis.

In the state in which the first control is canceled as illustrated in FIG. 8A, the distance between the vehicle V1 and the other vehicle V2 is short, and the operator M cannot open the door of the vehicle V1, cannot get into the vehicle V1 to drive the vehicle V1, and cannot take out a baggage from the vehicle. In contrast, in the state in which the second control is executed as illustrated in FIGS. 8A and 8B, the distance between the vehicle V1 and the other vehicle V2 is not less than the predetermined distance, and the operator M can get into the vehicle V1 to drive the vehicle V1, can take out a baggage from the vehicle, and can move the vehicle V1. The clearance CLR is formed such that the other vehicle V2 is left with a predetermined distance or more from the side opening part of the vehicle V1, and the operator can therefore get into the vehicle V1 from the right-side door DR to drive the vehicle V1.

(4) The control device 10 may calculate the second route for guiding the vehicle V1 to the evacuation space in which a wall (object) as a structure of the parking lot is left with a predetermined distance or more from an opening part of the vehicle V1.

Figure 9:
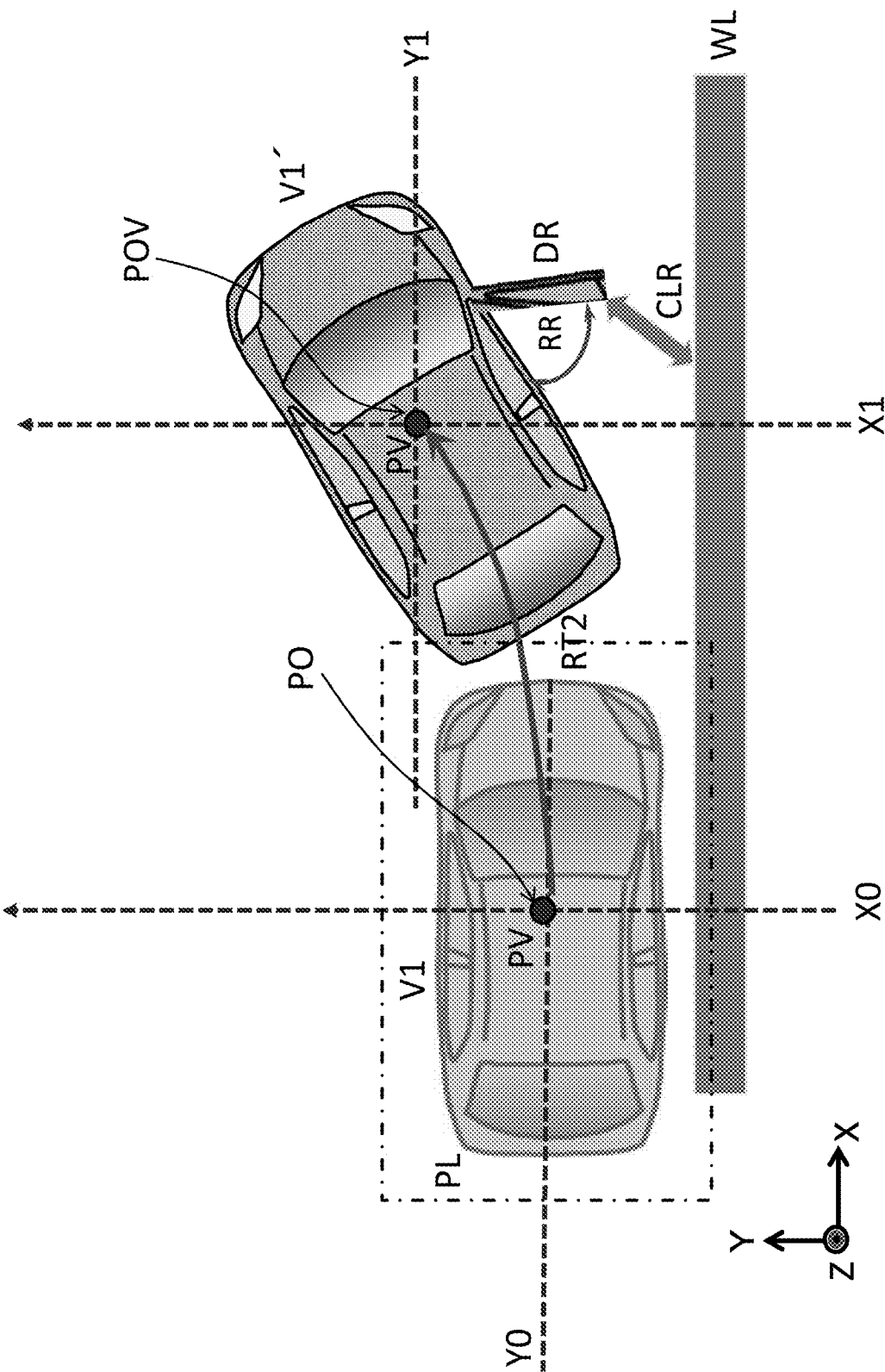
FIG. 9 is a diagram for describing a state in which the execution of the first control is canceled and the vehicle makes a stop and a state in which the execution of the second control is completed.

With reference to FIG. 9, the description will be made for the first control and the second control when the wall WL (object) exists next to the vehicle V1 to be parked.

FIG. 9 is a prediction diagram of a state in which the vehicle V1 is parked in the target parking space PL along the first route RT1. The wall WL exists next to the target parking space PL. When the existence areas of the target parking space PL and the wall WL overlap or when the distance between the target parking space PL and the wall WL is less than a predetermined distance, the execution of the first control is difficult and the control device 10 therefore determines to suspend/cancel the execution of the first control instruction. The control device 10 may determine to suspend/cancel the execution of the first control instruction when the distance between the target parking space PL and the wall WL is short and it is difficult to open the side door of the vehicle V1 after the execution of the first control. At this time, the reference position PV of the vehicle V1 is located at coordinates PO (X0 and Y0). As illustrated in the figure, the distance CLR between the wall WL and the vehicle V1 is less than a predetermined distance and, therefore, the opening part cannot be opened.

As illustrated in FIG. 9, the second route is calculated to guide the vehicle V1 to the evacuation space in which the wall WL (object) is left with a predetermined distance or more from the opening part of the vehicle V1. The reference position PV of the vehicle V1' located in the evacuation space after the execution of the second control is located at coordinates POV (X1 and Y1). A clearance CLR is formed between the opening part of the vehicle V1 located in the evacuation space and the wall WL. The clearance CLR formed between the door DR of the vehicle V1 and the wall WL is not less than a predetermined distance. The vehicle V1 moves to the evacuation space thereby to allow the right-side door DR to be moved in the range RR. The reference position PV of the vehicle V1 is located at the coordinates POV (X1 and Y1) when the second control is executed to move the vehicle V1 to the evacuation space.

In the state in which the first control is canceled, the distance between the vehicle V1 and the wall WL is short, and the operator M cannot open the door of the vehicle V1, cannot get into the vehicle V1 to drive the vehicle V1, and cannot take out a baggage from the vehicle. In contrast, in the state in which the second control is executed, the distance between the vehicle V1' and the wall WL is not less than the predetermined distance, and the operator M can get into the vehicle V1 to drive the vehicle V1, can take out a baggage from the vehicle, and can move the vehicle V1. The clearance CLR is formed such that the wall WL is left with a predetermined distance or more from the side opening part of the vehicle V1, and the operator can therefore get into the vehicle V1 from the right-side door DR to drive the vehicle V1.

(5) The control device 10 may calculate the second route for guiding the vehicle V1 to the evacuation space in which a wall (object) as a structure of the parking lot is left with a predetermined distance or more from an opening part of the vehicle V1.

Figure 10:
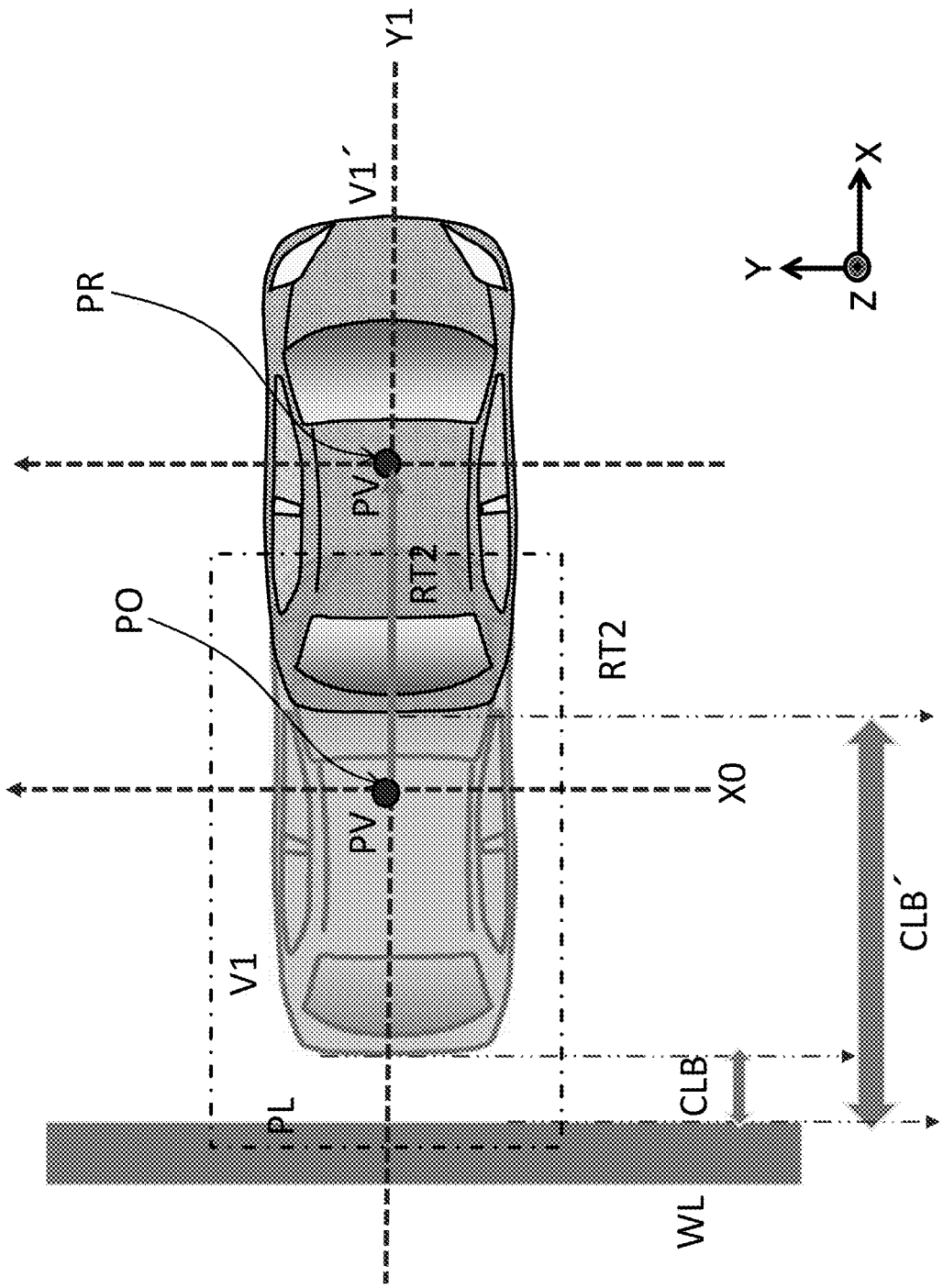
FIG. 10 is a diagram for describing a state in which the execution of the first control is canceled and the vehicle makes a stop and a state in which the execution of the second control is completed.

With reference to FIG. 10, the description will be made for the first control and the second control when the wall WL (object) exists behind the vehicle V1 to be parked. FIG. 10 is a prediction diagram of a state in which the vehicle V1 is parked in the target parking space PL along the first route RT1. The wall WL exists behind the target parking space PL. When the existence areas of the target parking space PL and the wall WL overlap or when the distance between the target parking space PL and the wall WL is less than a predetermined distance, the execution of the first control is difficult and the control device 10 therefore determines to suspend/cancel the execution of the first control instruction. The control device 10 may determine to suspend/cancel the execution of the first control instruction when the distance between the target parking space PL and the wall WL is short and it is difficult to open the rear opening part of the vehicle V1 after the execution of the first control. At this time, the reference position PV of the vehicle V1 is located at coordinates PR (X0 and Y0). As illustrated in the figure, the distance CLR between the wall WL and the vehicle V1 is less than a predetermined distance and, therefore, the rear opening part (trunk/hatchback door) cannot be opened.

As illustrated in FIG. 10, the second route is calculated to guide the vehicle V1 to the evacuation space in which the wall WL (object) is left with a predetermined distance or more from the opening part of the vehicle V1. The reference position PV of the vehicle V1' located in the evacuation space after the execution of the second control is located at coordinates X1 and Y1. A clearance CLB' is formed between the rear opening part of the vehicle V1 located in the evacuation space and the wall WL. The clearance CLB formed between the rear opening part of the vehicle V1 and the wall WL is not less than a predetermined distance. The predetermined distance between the rear opening part of the vehicle V1 and the wall WL is set to a distance that allows an occupant to stand between the wall WL and the vehicle V1 and open the back door of the rear opening part to handle a baggage in the trunk. The distance required to open and close the back door of the rear opening part may be set on the basis of the door opening/closing mechanism, the size of the door, and the distance from the door when opened. The vehicle V1 moves to the evacuation space thereby to allow the back door DR to be moved. The reference position PV of the vehicle V1 is located at the coordinates X1 and Y1 when the second control is executed to move the vehicle V1 to the evacuation space.

In the state in which the first control is canceled, the distance between the vehicle V1 and the wall WL is short, and the operator M cannot open the door of the vehicle V1, cannot get into the vehicle V1 to drive the vehicle V1, and cannot take out a baggage from the vehicle. In contrast, in the state in which the second control is executed, the distance between the vehicle V1' and the wall WL is not less than the predetermined distance, and the operator M can take out a baggage from the trunk.

Figure 11:
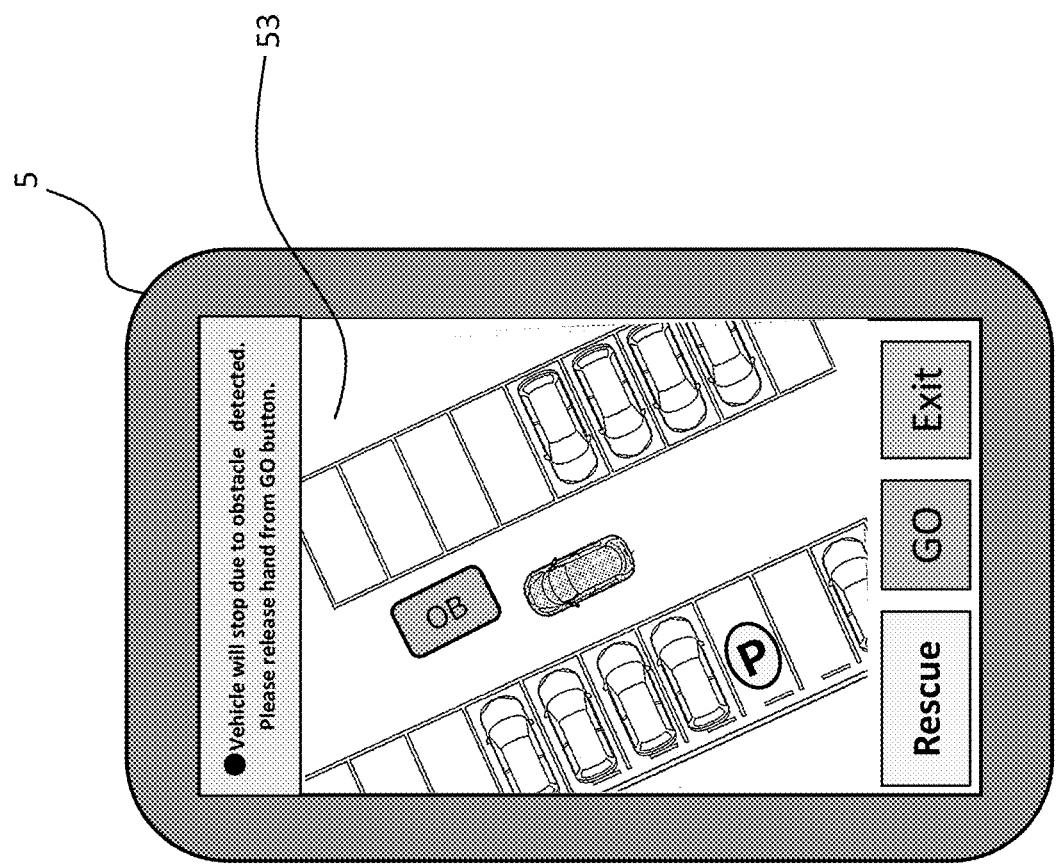
FIG. 11 is a diagram for describing an example of display information on an operation terminal carried by an operator.

Referring again to FIG. 4, in step 113, when the operator M commands to execute the second control instruction, the second control is started. FIG. 11 is a display example of the display 53 of the operation terminal 5 which receives the command to execute the second control instruction. As illustrated in FIG. 11, the display example includes the vehicle V1 before parking, other vehicles V2 parked around the vehicle V1, the target parking space PL for the vehicle V1, and an object OB present on the route to the target parking space PL (an object OB to which attention should be paid), which are presented after coordinate conversion as if they are viewed from above. The object OB is present near the point of turn for parking, so the first control is suspended when executed for the vehicle V1. In this case, the control device 10 displays a "Rescue" button that makes an inquiry to the operator M as to whether to execute the second control. When an acceptance input is made via the "Rescue" button, the second control instruction is executed. In this example, the name of the second control for the vehicle V1 to leave from the target parking space PL is referred to as a "Rescue" mode, but the name is not particularly limited. The "GO" button is an input button of the previously described deadman switch, and the execution of the first control is continued while the button is being pressed/touched.

After the second control is completed, the vehicle V1 is controlled to move to the evacuation space. The evacuation space is not a parking space and it is therefore necessary to move the vehicle V1 to a parking space.

In step 114, when the execution instruction/command for the first control for moving the vehicle to the target parking space PL is input again, the processes of step 115 and subsequent steps are performed to move the vehicle to the target parking space PL again.

In step 115, the control device 10 detects objects around the vehicle V1. In step 116, the control device 10 sets the target parking space PL again. In step 117, the control device 10 calculates the parking route (first route) to the target parking space PL. The parking route includes a position of turn for parking necessary for moving to the parking space. For this operation, the parking route is defined as a line and is also defined as a strip-shaped area corresponding to the occupied area by the vehicle V based on the vehicle width. The occupied area by the vehicle V is defined with consideration for the vehicle width and a margin width ensured for movement. The control device 10 confirms that no objects are detected within the occupied area.

In step 117, the control device 10 generates a control instruction for moving the vehicle V along the calculated parking route. The control device 10 preliminarily stores the spec information of the vehicle V necessary for the control instruction. Examples of the control instruction include operation instructions for the steering amount, steering speed, steering acceleration, shift position, speed (including zero), acceleration, and deceleration of the vehicle V, which are associated with the timing or position when the vehicle V travels along the parking route, and other operation instructions. The control instruction includes the execution timing or execution position of the above operation instruction for the vehicle V. The instruction regarding the parking route and the operation instruction associated with the parking route are executed by the vehicle V, and the vehicle can thereby be moved (parked) to the target parking position. The control instruction according to one or more embodiments of the present invention includes a stop instruction for the vehicle V at the second position. Additionally or alternatively, the control instruction may include an operation of opening a door of the vehicle V at the second position.

In step 118, the control device 10 monitors the change in the environment around the vehicle V until the vehicle V reaches the position of turn for parking. When the vehicle V reaches the position of turn for parking, the gear shift included in the control instruction is executed in step 119. Step 119 is followed by step 120, in which the parking control is completed by sequentially executing control instructions.

The parking control apparatus 100 according to one or more embodiments of the present invention controls the operation of the drive system 40 via the vehicle controller 70 in accordance with the control instruction so that the vehicle V moves along the parking route. The parking control apparatus 100 calculates command signals to the drive system 40 of the vehicle V, such as an EPS motor, while feeding back the output value of the steering angle sensor 50 of the steering apparatus so that the travel trajectory of the vehicle V coincides with the calculated parking route, and transmits the command signals to the drive system 40 or to the vehicle controller 70 which controls the drive system 40.

The parking control apparatus 100 according to one or more embodiments of the present invention includes a control unit for parking control. The control unit for parking control acquires shift range information from an automatic transmission/continuously variable transmission (AT/CVT) control unit, wheel speed information from an anti-lock brake system (ABS) control unit, steering angle information from a steering angle control unit, engine speed information from an engine control module (ECM), and other necessary information. On the basis of these information items, the control unit for parking control calculates and outputs instruction information on the autonomous steering to the electric power steering (EPS) control unit, instruction information such as warning to a meter control unit, etc. The control device 10 acquires information items, which are acquired by the steering angle sensor 50 of the steering apparatus of the vehicle V, the vehicle speed sensor 60, and other sensors of the vehicle V, via the vehicle controller 70.

The drive system 40 according to one or more embodiments of the present invention drives the vehicle V1 to move (travel) from the current position to the target parking position by driving based on the control command signals acquired from the parking control apparatus 100. The steering apparatus according to one or more embodiments of the present invention is a drive mechanism that moves the vehicle V in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V to the target parking position. The control content and operation scheme for parking of the vehicle V are not particularly limited, and any scheme known at the time of filing the present application can be appropriately applied.

When the parking control apparatus 100 according to one or more embodiments of the present invention controls the vehicle V to move to the target parking position along the route calculated on the basis of the position of the vehicle V and the position of the target parking position, the accelerator and the brake are controlled in an autonomous manner on the basis of the designated control vehicle speed (set vehicle speed), and the operation of the steering apparatus controls the movement of the vehicle V in an autonomous manner in accordance with the vehicle speed.

The parking control method according to one or more embodiments of the present invention is used in the parking control apparatus as the above and therefore exhibits the following effects. The parking control apparatus 100 according to one or more embodiments of the present invention is configured and operates as the above and therefore exhibits the following effects.

(1) In the parking control method according to one or more embodiments of the present invention, even when the vehicle is controlled to make a stop in a parking space, the user can enter the parking space.

In the control method according to one or more embodiments of the present invention, when the execution of the first control instruction is suspended or canceled, the control device 10 sets as the second route a route for the vehicle V1 to leave with a predetermined distance or more from the object detected around the vehicle V1. Thus, by making the vehicle V1 leave with a predetermined distance or more from the object, the operator can pass through a space between the vehicle V1 and the object. When the suspension of the first control is due to the presence of a movable object, the operator M can move (take away) the object thereby to allow the parking control (first control) to be executed again, but if a person cannot enter the parking space, he/she cannot remove the object. Moreover, if the vehicle is stopped without a sufficient space between the vehicle and the object such as a wall or another vehicle, the operator M cannot get into the vehicle V1 to drive (perform the parking operation) for him/herself and also cannot take out a baggage from the vehicle V1. It is necessary to determine whether or not to continue the execution of the first control instruction, and the execution of the first control instruction may of course be suspended or canceled. The above situations, that is, the situations in which it is not possible to enter the parking space for taking away the object, get on the vehicle V1, and open an opening part such as a door or a trunk of the vehicle V1 when the vehicle V1 is stopped due to the suspension/cancellation of the first control, deteriorate the convenience and reliability of the parking control apparatus itself. In one or more embodiments of the present invention, when the execution of the first control instruction is suspended or canceled, the second route for the vehicle V1 to leave with a predetermined distance or more from the object detected around the vehicle V1 is calculated, and it is therefore possible to prevent the situations in which it is not possible to enter the parking space, get on the vehicle V1, and access an opening part such as a door or a trunk of the vehicle V1 when the vehicle V1 is stopped.

(2) In the parking control method according to one or more embodiments of the present invention, when the execution of the first control instruction for the vehicle V1 is suspended or canceled at a position at which at least part of the vehicle V1 belongs to the target parking space, the control device 10 is caused to execute the second control instruction for moving the vehicle along the second route. The control device 10 compares the existence area (XY coordinates) of the vehicle V1 with the area (XY coordinates) of the target parking space at the timing at which the execution of the first control instruction is suspended or canceled, and when the areas partially overlap each other, the control device 10 calculates the second route and executes the second control (rescue mode). When the vehicle V1 makes a stop at a position at which at least part of the vehicle V1 belongs to the target parking space, it is highly possible to fall into a state that cannot be handled, such as a state in which it is not possible to enter the parking space, get on the vehicle V1, or access an opening part such as a door or a trunk of the vehicle V1 when the vehicle V1 is stopped. In one or more embodiments of the present invention, the second route is calculated when the possibility of the occurrence of such a state that cannot be handled is high, and it is therefore possible to prevent the execution of the second control (rescue mode) which is not necessary in a situation that cannot be handled.

(3) In the parking control method according to one or more embodiments of the present invention, the control device 10 may set an evacuation space at a position left with a predetermined distance or more from an object and calculate the second route to the set evacuation space. The second route is obtained after the evacuation space is set, and the vehicle V1 can therefore be guided to the position left with the predetermined distance or more from the object.

(4) In the parking control method according to one or more embodiments of the present invention, in the state in which the second control is executed, the distances between the vehicle V1 and the structure ST are not less than a predetermined distance, and the operator M can drive the vehicle V1, can take out a baggage from the vehicle, and can move the vehicle V1.

(5) In the parking control method according to one or more embodiments of the present invention, in an example in which the control device 10 detects the position of an operator M and forms a clearance having a predetermined distance or more between a structure ST and an opening part closest to the position of the operator M among a plurality of opening parts (such as a door and a trunk) of the vehicle V1, the control device 10 sets a clearance CLL between the left-side door closest to the operator M and the structure ST as the control target (which is controlled to have a predetermined distance or more). In this case, the width of the clearance CLL may be set larger than the width of a clearance CLR. By forming a passage (clearance) in a place through which the operator M can easily access the opening part (such as a door or a trunk), the user convenience can be improved.

(6) In the parking control method according to one or more embodiments of the present invention, the opening parts of the vehicle V1 include side opening parts. The side opening parts are side doors. The clearances are formed such that an object is left with a predetermined distance or more from a side opening part of the vehicle V1, and the operator can therefore get into the vehicle V1 from the side opening part to drive the vehicle V1.

(7) In the parking control method according to one or more embodiments of the present invention, the opening parts of the vehicle V1 include a rear opening part. Examples of the rear opening part include a trunk door and a hatchback door. The clearances are formed such that an object is left with a predetermined distance or more from the rear opening part of the vehicle V1, and the operator can therefore take out a baggage or the like from the rear opening part.

(8) In the parking control method according to one or more embodiments of the present invention, a clearance is formed between the entrance ET of the parking space PL and an opening part of the vehicle V1 and it is therefore possible to ensure an entry route into the parking space PL.

(9) Also in the parking control apparatus 100 in which the method according to one or more embodiments of the present invention is executed, the actions and effects as described in the above (1) to (8) are exhibited.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device
11 CPU
12 ROM
13 RAM
132 Storage device
133 Map information
134 Parking lot information
135 Object information
20 Input device
21 Communication device
211 Antennas
30 Output device
31 Display
1a-1d Cameras
2 Ranging devices
3 Information server
31 Communication device
32 Storage device
33 Map information
34 Parking lot information
35 Object information
5 Operation terminal
51 Communication device
52 Input device
53 Display
200 Onboard device
40 Drive system
50 Steering angle sensor
60 Vehicle speed sensor
70 Vehicle controller
80 Seating sensor
V, V1 Vehicle

What is claimed is:

1. A parking control method, comprising:
   causing a control device of a vehicle to execute a first control instruction for moving the vehicle along a first route to a target parking space, on a basis of an operation command acquired from an operator;
   detecting an object around the vehicle;
   determining that the vehicle cannot travel along the first route without being obstructed by the object;

determining that execution of the first control instruction is suspended or canceled when the travel along the first route is determined to be not possible for the vehicle, wherein the first control instruction is suspended or canceled along the first route in a suspended position that is partially within the target parking space;

when a distance between the vehicle and the object detected around the vehicle is less than a predetermined value when the execution of the first control instruction is suspended or canceled, setting an evacuation space to which the vehicle is movable, the evacuation space being a predetermined distance or more from the object detected around the vehicle and partially within the target parking space;

calculating a second route to the evacuation space;

executing with the control device a second control instruction to move the vehicle along the second route in a direction that is opposite of the first route and is a continuous movement to the evacuation space; and after moving to the evacuation space, executing the first control instruction again to move the vehicle into the target parking space, wherein the target space, the suspended position, and the evacuation space each partially overlap.

2. The parking control method according to claim 1, further comprising:

when the execution of the first control instruction for the vehicle is suspended or canceled at a position at which at least part of the vehicle is in the target parking space, executing the second control instruction to move the vehicle along the second route.

3. The parking control method according to claim 1, further comprising:

detecting that the object is a structure of the target parking space, wherein the evacuation space is set at a position at which a clearance having a predetermined width or more is formed between the structure and an opening part of the vehicle moved to the evacuation space.

4. The parking control method according to claim 3, further comprising:

detecting a position of the operator; and forming the clearance having the predetermined width or more between the structure and the opening part closest to the position of the operator among a plurality of the opening parts.

5. The parking control method according to claim 3, wherein the opening part is a side opening part of the vehicle.

6. The parking control method according to claim 3, wherein the opening part is a rear opening part of the vehicle.

7. The parking control method according to claim 3, wherein the clearance is formed between an entrance of the target parking space and the opening part.

8. A parking control apparatus, comprising a control device configured to execute a first control instruction for moving a vehicle along a first route to a target parking space, on a basis of an operation command acquired from an operator, the control device operating to:

detect an object around the vehicle;

determine that the vehicle cannot travel along the first route without being obstructed by the object;

determine that execution of the first control instruction is suspended or canceled when the travel along the first route is determined to be not possible for the vehicle, wherein the first control instruction is suspended to canceled along the first route in a suspended position that is partially within the target parking space;

when a distance between the vehicle and the object detected around the vehicle is less than a predetermined value when the execution of the first control instruction is suspended or canceled, set an evacuation space to which the vehicle is movable, the evacuation space being a predetermined distance or more from the object detected around the vehicle and partially within the target parking space;

calculate a second route to the evacuation space;

execute with the control device a second control instruction to move the vehicle along the second route in a direction that is opposite of the first route and is a continuous movement to the evacuation space; and after moving to the evacuation space, execute the first control instruction again to move the vehicle into the target parking space, wherein the target space, the suspended position, and the evacuation space each partially overlap.

9. The method of claim 1, wherein the predetermined distance is 40 cm to 70 cm so that an opening part is openable without obstruction by the object.

* * * * *